(12) United States Patent
Fukunaga et al.

(10) Patent No.: US 6,259,872 B1
(45) Date of Patent: Jul. 10, 2001

(54) SUPPORT STRUCTURE FOR AN IMAGE PROCESSING DEVICE

(75) Inventors: Takahiro Fukunaga, Hiroshima; Hiroshi Kida, Yamatokoriyama; Kazuo Nakamura, Kashiba; Toyoaki Nanba, Higashiosaka; Syoichiro Yoshiura, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/288,575

(22) Filed: Apr. 9, 1999

(30) Foreign Application Priority Data

| Apr. 9, 1998 | (JP) | 10-097032 |
|---|---|---|
| Aug. 28, 1998 | (JP) | 10-242655 |
| Feb. 2, 1999 | (JP) | 11-024477 |

(51) Int. Cl.[7] .................................................. G03G 15/00
(52) U.S. Cl. ................................. 399/107; 399/110
(58) Field of Search .............................. 312/265.1, 265.2, 312/265.4; 399/91, 92, 98, 107, 108, 110; 211/134, 187, 188, 194, 195

(56) References Cited

U.S. PATENT DOCUMENTS 5,423,604 * 6/1995 Chern ................................. 312/265.1

FOREIGN PATENT DOCUMENTS

| 63-188160 | 8/1988 | (JP) . |
|---|---|---|
| 2-287377 | * 11/1990 | (JP) . |
| 333762 | 2/1991 | (JP) . |

* cited by examiner

Primary Examiner—Sophia S. Chen
Assistant Examiner—Hoang Ngo

(57) ABSTRACT

Support structures for containing and supporting components forming a digital copier are configured with square pipes and are provided separately in association with a plurality of units of the digital copier. The effect of distortion is eliminated when the support structures are joined to maintain positional accuracy. Square pipes are combined to form each of a first support structure for containing and supporting various components forming the digital copier, for example, an image forming process portion and a fixing portion and a second support structure for containing and supporting various components to be incorporated therein as needed, for example, a sheet supplying portion. To combine the first and second support structures, square pipes and square pipes orthogonal to each other are joined in the regions of joining surfaces. This makes it possible to prevent, for example, distortion and twisting between the supporting structures.

11 Claims, 13 Drawing Sheets

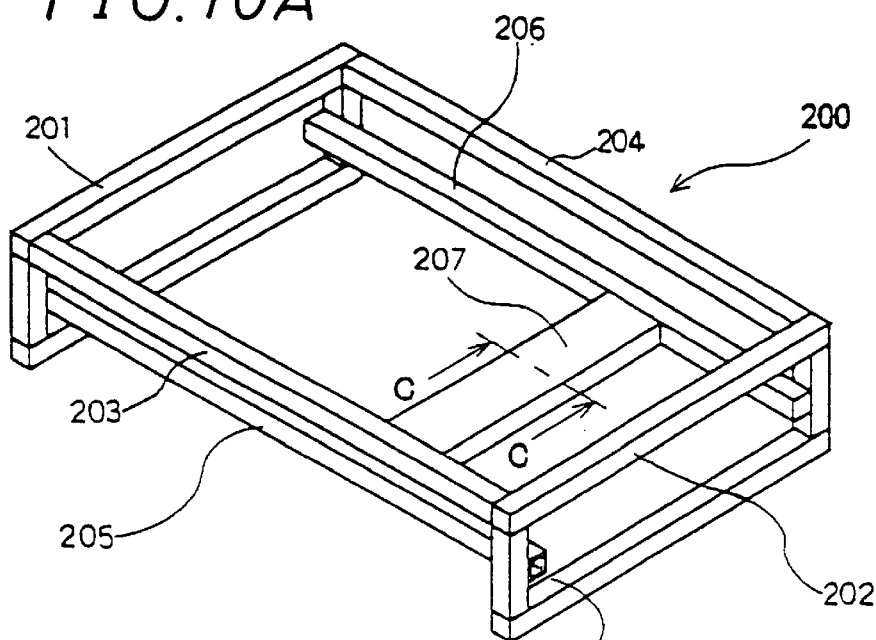
FIG. 10A
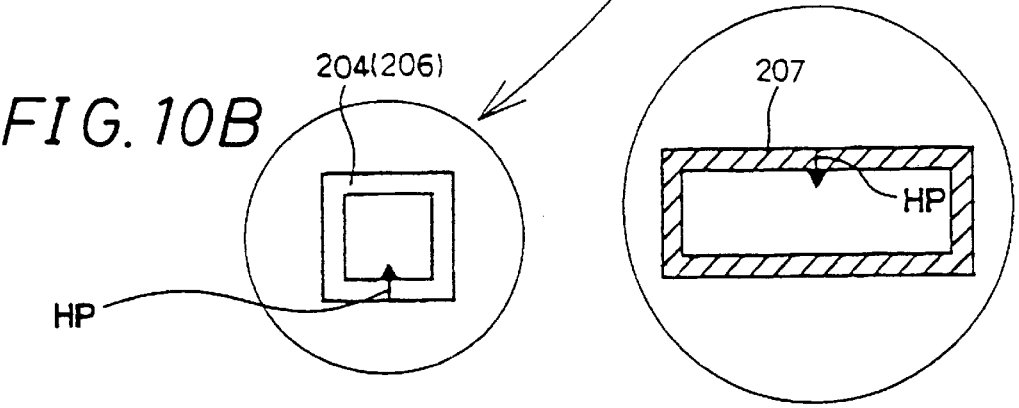
FIG. 10B
FIG. 10C

SUPPORT STRUCTURE FOR AN IMAGE PROCESSING DEVICE

BACKGROUND OF THE INVENTION

1. Field of the Invention

The present invention relates to a support structure for supporting a plurality of components forming a part of an electronic apparatus and to a support structure which is combined with other support structures to complete the electronic apparatus. For example, the present invention relates to a support structure in an image forming apparatus such as a digital copier or optical printer, which support structure is completed by combining a plurality of square bodies which are realized by square pipes, and supports each of components as described above so as to maintain a predetermined positional relationship between them, namely, positional accuracy, and as well which is combined with other support structures while the positional relationship between the components being maintained.

2. Description of the Related Art

A support structure, namely, housing structure, commonly used in an image forming apparatus is a support structure which holds components including units, which components form an image forming apparatus between front and rear frames fabricated by punching metal sheets through press processing. Another means for forming a support structure is to perform integral molding of a resin to form a housing, namely frames in which each component is positioned.

However, the former configuration of a support structure is likely to cause deflection, in other words, distortion, of the front and rear metal sheet frames that form the housing of the support frame in the case of a large-sized apparatus, which makes it impossible to maintain the positional accuracy between the components. For example, in the case of an image forming apparatus in which the surface of a photosensitive body is irradiated by laser light to optically scan the same, even if the unit for laser beam irradiation and the photosensitive body are supported so that their positional accuracy is maintained, distortion or the like associated with the strength of the frames makes it impossible to maintain the positional accuracy.

As the processing speed of an apparatus increases, the front and rear frames serving as a housing of the support frame become more liable to distortions, which makes it impossible to maintain the positional accuracy between the components as described above. Vibration occurs at the main body of the apparatus in relation to the strength of the frames just as described above, which causes deviations and consequently a reduction in image quality.

With the latter configuration of a support structure, positional accuracy between components can be maintained to some degree. However, the method based on integral molding of resin is limited by the size of the housing, namely, frames, with respect to the method and cost for manufacturing the same. Therefore, this method will have some limitation when applied to large or high speed processing apparatuses.

Under such circumstances, products have recently been marketed which are support structures in the form of frames completed by welding square hollow pipes and configured to support various components in a space maintained by the support structure.

With this configuration, since the support structure is formed by square pipes as a frame, the strength of the support structure can be maintained even in a large apparatus, which is significantly advantageous in that working of mounting components can be simplified.

For example, Japanese Unexamined Patent Publications JP-A 63-188160 (1988) and JP-A 3-33762 (1991) disclose configurations in which square hollow pipes as frames form a support structure as described above and in which various components forming an electronic photocopier are supported in spaces maintained by the structure.

An image forming apparatus includes a scanner for reading images. Such a scanner includes means for optically scanning an original document for reading an original document image, and beams from the image obtained by the scanning means are projected, for example, upon a photosensitive body or the like which is a recording medium or projected upon a reading device such as a CCD. Therefore, a similar support structure is fabricated to support various components constituting a scanner including the scanning means in a space by the support structure.

In the above-described scanner, the scanning means for optically scanning an original document must be supported with improved positional accuracy, and the positional accuracy can be maintained by providing a support structure constituted by square hollow pipes as described above.

Digitalization is recently being accelerated in the market of copiers, while increasing in size and speed being accelerated in the market of printers. Matters of concern under such circumstances are positional accuracy between various components which form electronic apparatuses such as copiers and printers and reduction of vibration and distortion of the body of the apparatuses themselves. If such problems can not be solved, the quality of an image reproduced and outputted by an image forming apparatus will be adversely affected. As a result, the strength of a support structure for supporting various components constituting each copier or printer becomes significantly important.

A support structure of metal sheet frame has problems with mechanical strength, deviations and the like as described above, whereas integrally molded resin frames have problems in size and cost.

When image forming apparatuses are introduced onto the market, it is necessary to provide a line of apparatuses which can respond to any need of the market. When an apparatus is provided as a structure supported by square pipes as a whole, the basic configuration of the apparatus is fixed. In image forming apparatuses, an image forming portion and a sheet supply portion for supplying sheets as a recording material in various sizes are provided such that they can be separated from each other. According to the disclosure of techniques for support structures in the above-cited patent publications, however, an image forming portion and a sheet supply portion can not be separated from each other because of the integral structure.

A digital copier can substantially be provided by combining a printer and a scanner, however, if the printer and scanner are supported by an integrated support structure for this purpose, they can not be separated as individual apparatuses as described above. Accordingly it is necessary to prepare a separate support structure to be exclusively used for them.

As described above, when an apparatus is to be introduced onto the market which has a main body composed of individual units which can be separated for respective functions for responding to various needs of the market, an integral configuration type support structure can not fulfill the requirement, for example, such a structure can not respond to image processing in various sizes of sheets using an image forming portion including a portion for supplying at least sheets in one size and a separate portion for supplying sheets in another size to be used in combination as needed.

A printer as an image forming apparatus can be configured as a copier by attaching a scanner thereto, and the positional accuracy of the scanner and printer can be improved by supporting both of them by a single support structure. However, in order to singly use them as a printer or as a scanner, it is necessary to provide separate support structures.

SUMMARY OF THE INVENTION

Hence, the present invention provides a support structure having such a configuration that positional accuracy between various components of an apparatus is improved, and vibration, twist and distortion of a main body of the apparatus are reduced and the apparatus can be divided into units for respective functions, and easily combined as needed for the purpose of enhancing the functions.

It is another object of the invention to provide a support structure which have a configuration that allows diverse electronic apparatuses to respond to any need of the market as well as a need of use as an image forming apparatus capable of reproducing faithful images.

It is still another object of the invention to provide separate support structures for an image forming apparatus and an image reading apparatus (scanner) for each of which support structures positional accuracy can be maintained and which can be combined into an integrated support structure with the positional accuracy of both structures maintained to provide a copier.

In order to achieve the above-described objects, in a first aspect of the present invention, there is provided a support structure comprising a first support structure for supporting respective components forming an electronic apparatus, and a second support structure provided separately from the first support structures, for supporting other components required for forming the electronic apparatus, the first and second support structures being combined to provide an integrated support structure for a single electronic apparatus, wherein each of the first and second support structures is formed by combining a plurality of square hollow members to provide spaces for containing and supporting the components and other components; and the square hollow members for the first support structure and the square hollow members for the second support structure are joined in a face-to-face relationship such that they are in contact with each other in a part of one face of each of them which are joined.

In such configuration, for example, when upper and lower apparatuses having separate functions are integrated to configure an electronic mechanism having improved functions, the support structure of one of them is placed on the support structure of the other and they are joined with each other such that the contact area between the square hollow members that form the first and second support structures is made as small as possible. Specifically, the square hollow members for the first support structures and the square hollow members for the second support structure contact with each other in only a part of one surface of each of the members which are joined in a face-to-face relationship. As a result, when the first and second support structures are joined together in respective positions, they will not directly exert the effect of distortion, twisting vibration and the like to the other support structure. It is therefore possible to maintain not only the relative positions of the structures but also the positions of components of an electronic apparatus supported in the space defined by those support structures.

In a second aspect of the present invention, the support structure as described above is characterized in that the respective square hollow members forming the first and second support structures are joined to be in contact with each other in a part of one surface of each of them such that the square hollow members are orthogonal to each other. This makes it possible to minimize the area of the joined portion. As a result, they do not interfere with each other as described, which eliminates misalignment attributable to distortion, twisting, vibration and the like.

In third and fourth aspects of the invention, the support structure is characterized in that first or second support structure is configured such that at least either of the square hollow members of the first and second support structures joined into contact with each other is assembled to protrude from other hollow members secured to the hollow member to form the support structure. When the first and second support structures are joined together, since the joined square hollow members thus protrude from other hollow members, the other hollow members will not contact the joined square hollow members and will not be joined. This makes it possible to minimize the contact area and to eliminate the mutual effect of distortion and the like.

In fifth and sixth aspects of the present invention, the support structure is characterized in that the surfaces of the square hollow members forming the first support structure and the square hollow members forming the second support structure which are in contact with each other are not surfaces including bonded portions formed during the fabrication of the hollow members. As a result, the first and second support structures can be joined at surfaces defining the square hollow members other than those which are assumed to be significantly distorted. In addition, by joining the structures to each other at surfaces other than the surfaces as described above, mutual effects between the structures such as twisting and distortion can be minimized.

In seventh and eighth aspects of the invention, the support structure is characterized in that a positioning member is provided in a position where the first and second support structures are joined and in that the positioning member is provided in at least two points in the longitudinal direction thereof. Such a configuration makes it possible to minimize misalignment of the first and second support structures during positioning. Specifically, since the positional relationship between the first and second support structures is accurately maintained to allow the support structures to be properly positioned relative to each other in the longitudinal direction of an apparatus when joined, misalignment in a lateral direction is minimized and they can be preferably joined.

In ninth and tenth aspects of the invention, the support structure is characterized in that the electronic apparatus is an image forming apparatus for reproducing an image on a recording material; at least an image forming portion for reproducing an image on a recording material is supported by the first support structure; a supply portion for supplying a recording material to the image forming portion is supported by the second support structure; and the positioning members on each of the first and second support structures are provided such that their longitudinal direction is the transport direction of the recording material. This makes it possible to minimize misalignment of the first and second support structures during positioning as described above. This significantly reduces shift of the transport direction during the transportation of a sheet in the image forming apparatus during transfer of the sheet from the second support structure to the first support structure or the like, which contributes to reduction of failures of transportation and the like.

In an eleventh aspect of the invention, the support structure is characterized in that at least either the first or second support structure includes retractable handles facing each other contained in a space between a pair of parallel square hollow members to allow the first or second support structure to be lifted in a stable state, thereby to be joined to a part of the other support structure while being lifted using the handles. Specifically, the first or second support structure is placed using the handles on the other structure in an overlapping relationship, which significantly facilitates joining and prevents distortion from being caused between them. Further, since the handles are retractable into a square hollow member, there is no need for a special containing portion, and the handles can be used as carry handles when the electronic apparatus is finally completed.

In a twelfth aspect of the invention, for example, in the case where a scanner is standalone, for achieving the above-described object of providing a support structure which supports a scanner by itself, configuration for supporting various components of the scanner and for supporting components for which high positional accuracy is required, there is provided a support structure for supporting various components of original document scanning means for scanning in relation to an original document to be read to form an original document image in a target position in order to optically read the original document image, the support structure being formed by combining a plurality of hollow members each having a square configuration to define a space in which the components are contained and supported, wherein a square support hollow member of the support structure for supporting a part of the original document scanning means serves as a reference and the rest of the square hollow members are joined to the support hollow member.

Such a support structure is fabricated by a square hollow member, e.g., a square pipe, for supporting a part of components of original document scanning means which must have high positional accuracy serves as a reference and is secured to, for example, a positioning jig and by joining other square pipes forming a frame of the support structure to the support square pipe as a reference using welding or the like. Since a square pipe for supporting components which must have high positioning accuracy is thus used as a reference, it is possible to prevent the occurrence of distortion, twisting and the like at the reference square pipe when the other pipes are joined. This makes it possible to improve the positional accuracy of components which must have high positional accuracy, especially those for optical scanning means for reading images. In this case, the scanner can be used in a stand-alone configuration.

In a thirteenth aspect of the invention, the support structure is characterized in that the original document scanning means includes scanning means which is driven to travel to optically scan an original document, a support hollow member for supporting the scanning means serves as a reference, and the scanning means can be maintained in a predetermined positional relationship with the original document. This makes it possible to an image of the original document can be accurately projected in a target position during reading and scanning.

In a fourteenth aspect of the invention, the support structure is characterized in that the bonded portion of the support hollow member is not on the surface supporting the scanning means in order to support the scanning means directly by the support hollow structure. This makes it possible to prevent any reduction of the positional accuracy of the scanning means attributable to distortion and the like even in a case wherein the scanning means is directly supported by a square pipe. Especially, when the scanning means is driven for a travel on an original document, since there is no effect of distortion on the support surface of the support square pipe, the vibration of the scanning means driven for travel is eliminated and an image of the original document can be reliably projected in a target position to allow preferable reading.

In a fifteenth aspect of the invention, the support structure is characterized in that the original document scanning means comprises scanning means for optically scanning an original document and a reading unit for optically reading an image by forming an optical image of the original document scanned by the scanning means on a reading element and in that a plurality of support hollow members for supporting the scanning means and reading unit are used as a reference. In such a configuration, it is possible to prevent any reduction of positional accuracy between components supported by the support structure, thereby improving positional accuracy. In this case, since an image obtained by scanning an original document can be accurately formed on the reading element of the reading unit, reading accuracy can be improved.

In a sixteenth aspect of the invention for achieving the above-described object, there is provided a support structure capable of suppressing effects such as distortion and twisting in joining to achieve positioning accuracy and the like between them in order to fabricate a copier by combining an image forming portion and a scanner portion as an image reading device, characterized in that a second support structure is formed by joining a plurality of square hollow members to the support structure to define a space in which various components including an image forming portion are contained and supported;

members for positioning the second support structure and the support structure relative to each other when they are joined to each other are provided in the joining position; and the square hollow members are joined in an orthogonal relationship with each other.

Such a configuration makes it possible to suppress distortion of the support structures when they are joined. As a result a predetermined positional relationship can be maintained between various components of a scanner and an image forming portion which must be accurately positioned. Thereby it is possible to provide a support structure for supporting a scanner alone and a support structure for supporting a printer as an image forming device alone to join the support structures as described above instead of providing an integral configuration in advance. As a result, it is possible to provide a copier which is a combination of a scanner portion and an image forming portion when needed and to support the scanner portion alone with the same support structure, which eliminates the need for separate support structures for individual and combined configurations. Especially, this makes it possible to provide a diverse line of products which satisfy needs in the markets using the same support structure, and the use of the same support structure allows a significant reduction of manufacturing cost.

According to configurations of the invention, when the body of an apparatus is configured as separate units for respective functions, components forming each unit are supported by a support structure formed by combining square hollow members to configure a single unit, and the units are combined in a predetermined state as a need arises to configure a single system apparatus. This makes it possible to improve positional accuracy between units of components and to reduce vibration and distortion of the apparatus body. In the case of an image forming apparatus, for example, an output image can be reproduced faithfully.

It is also possible to provide a line of apparatuses which can respond to any need in the market.

In the configuration according to the first aspect of the invention, square hollow members for a first support structure for supporting various components of an electronic apparatus and square hollow members for a second support structure are joined such that they are in contact with each other in a part of respective surfaces in a face-to-face relationship. As a result, when the first and second support structures that support a plurality of components in respective positions are joined to each other, it is possible to prevent them from directly exerting the effect of distortion, vibration and the like to the other structure.

According to the second aspect of the invention, since square pipes orthogonal to each other are joined such that they contact with each other in a part of surfaces thereof in a face-to-face relationship. As a result, when first and second support structures supporting a plurality of components in respective positions are joined to form an integrated support structure, the contact area between the square pipes forming the support structures is minimized. This makes it possible to prevent them from directly exerting the effects of distortion, vibration and the like to the other support structure.

According to the third and fourth aspects of the invention, a first support structure and a second support structure have a configuration in which square pipes joined to each other are assembled such that they protrude from other square pipes secured to the square pipes which form the support structures. Therefore, only the joined pipes are in contact with each other, which minimizes the joining area. In addition, if the joined square pipes are provided in an orthogonal relationship with each other as described above, the joining area is minimized. This makes it possible to join them with their positional relationship maintained while preventing them from exerting the effect of vibration to each other.

According to the fifth and sixth aspects of the present invention, when first and second support structures are secured to each other with square pipes forming them in contact with each other in surfaces thereof in a face-to-face relationship, surfaces of the square pipes forming the support structures having bonded portions formed during the manufacture of the same are not used as the securing or joined surfaces. Thus, an integrated support structure is formed by joining the first and second support structures on surfaces of the pipes other than the surfaces considered to be significantly distorted. This prevents the support structures from exerting the effect of distortion and the like to each other.

According to the seventh and eighth aspects of the invention, when first and second support structures are positioned and joined, positioning members are provided in two joining positions in the longitudinal direction of the support structures. This makes it possible to minimize mutual the amount of misalignment. Especially, the amount of misalignment in the lateral direction is minimized relative to misalignment in the longitudinal direction during positioning. This improves the accuracy of positioning.

According to the ninth and tenth aspects of the invention, when first and second support structures are positioned when they are joined, misalignment in the lateral direction is minimized as described above where it is assumed that the transport direction of sheets of paper is the longitudinal direction. This allows components to be preferably positioned and allows the support structures to be positioned to each other in a predetermined positional relationship. This makes it possible to transfer sheets of paper or the like between the support structures which are maintained in a predetermined relationship and to thereby suppress skewed feed or the like.

According to the eleventh aspect of the invention, retractable handles for transporting support structures are contained in and pulled out from a pair of parallel pipes among square pipes forming at least either of the support structures. This makes it possible to carry the support structures in a stable state without distorting the positional relationship between various components supported by the support structures. In addition, since the carrying handles are contained in the square pipes, there is no special need for providing a space for mounting and containing the handles therein.

According to the twelfth aspect of the invention, a support structure for defining a space for supporting various components of a device for reading images is fabricated by assembling square pipes using a support square pipe for supporting components which must be accurately positioned as a reference. This makes it possible to eliminate distortion and the like of the support square pipe, to improve the accuracy of supporting positions and to thereby improve reading accuracy.

According to the thirteenth aspect of the invention, square pipes are combined, i.e., secured, using a support square pipe, as a reference, for supporting scanning means according to the sixth aspect of the invention driven for a travel to scan an image of an original document which forms a part of an image reading device. This allows the scanning means driven for a travel to preferably scan the original document, thereby improving the effect of increasing reading accuracy.

According to the fourteenth aspect of the invention, a bonded portion formed during the fabrication of a square pipe is not used as a support surface for supporting components which must be accurately positioned. This makes it possible to prevent any reduction in positioning accuracy attributable to significant distortion, twisting and the like of such a surface.

According to the fifteenth aspect of the invention, a support structure is formed using a plurality of support square pipes as a reference which support original document scanning means and a reading unit for forming an image of a scanned original document of a reading device. This makes it possible to maintain them in an accurate positional relationship with each other. Thus, reading accuracy can be improved.

In addition, according to the sixteenth aspect of the invention, when a support structure for supporting various components of an image forming portion and a support structure for a reading portion are combined into an integrated support structure, the effect of distortion and the like of the support structures on each other can be minimized to support the various components accurately without changing the positional relationship between them. The support structures for forming the image forming device and reading device independently can be used as they are as the support structure in this case, which contributes to a reduction of the cost of the apparatus. Furthermore, since there is no special need for providing separate support structures to use each device independently and to use them in combination, it is easy to provide a line of various apparatus which can be separated to provide functions to satisfy needs in the market.

BRIEF DESCRIPTION OF THE DRAWINGS

Other and further objects, features, and advantages of the invention will be more explicit from the following detailed description taken with reference to the drawings wherein:

FIG. 1 is a perspective view illustrating a first embodiment of the present invention which is an integrated support structure formed by joining a first support structure and a second support structure for supporting various components forming an electronic apparatus or the like;

FIG. 4A is a view showing a state before the positioning, and FIG. 4B is a view showing a state after the positioning;

FIGS. 10A through 10C illustrate a second embodiment of the present invention and show a configuration of a support structure for supporting various components of a scanner portion which is an image reading device, FIG. 10A is a perspective view showing the support structure as a whole, FIG. 10B is a view showing the relationship between a joining portion formed during the fabrication of square pipes forming the support structure and the assembly of the same, FIG. 10C is a sectional view taken along the line C—C;

DETAILED DESCRIPTION OF THE PREFERRED EMBODIMENTS

Figure 1:
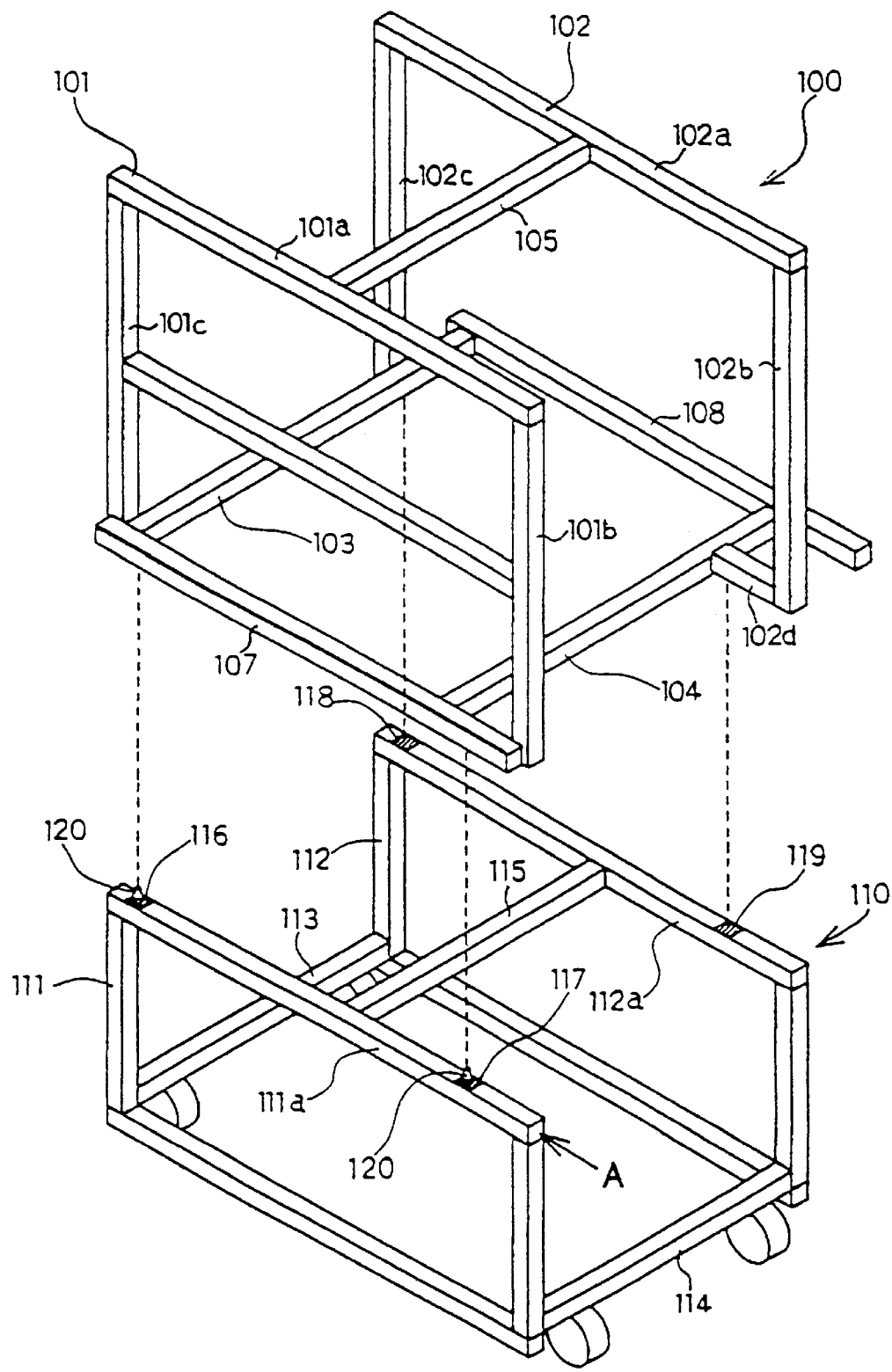

Now referring to the drawings, preferred embodiments of the invention are described below.

Figure 2:
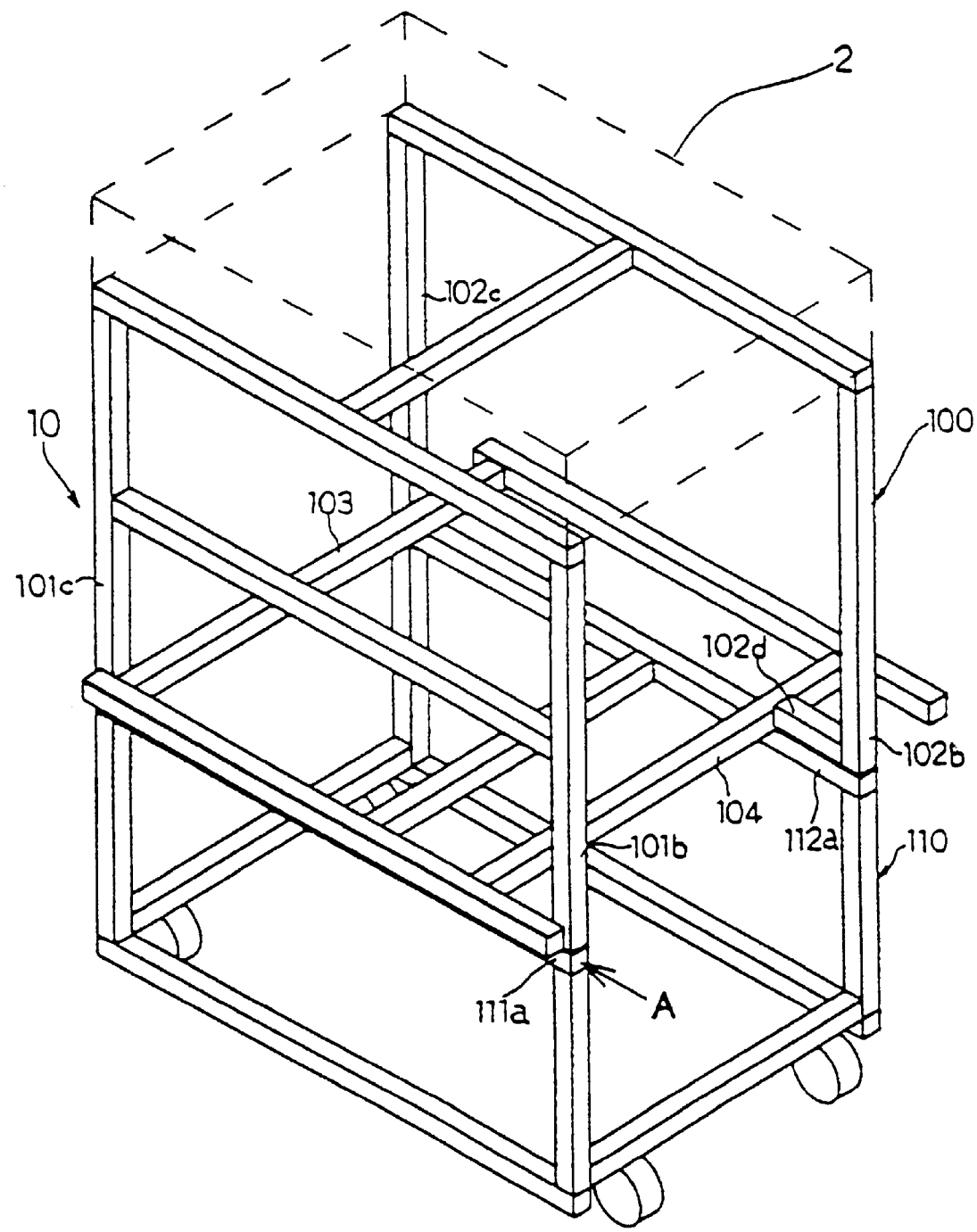
FIG. 2 is a perspective view showing the formation of the integrated support structure by joining the first and second support structures shown in FIG. 1.
Figure 3:
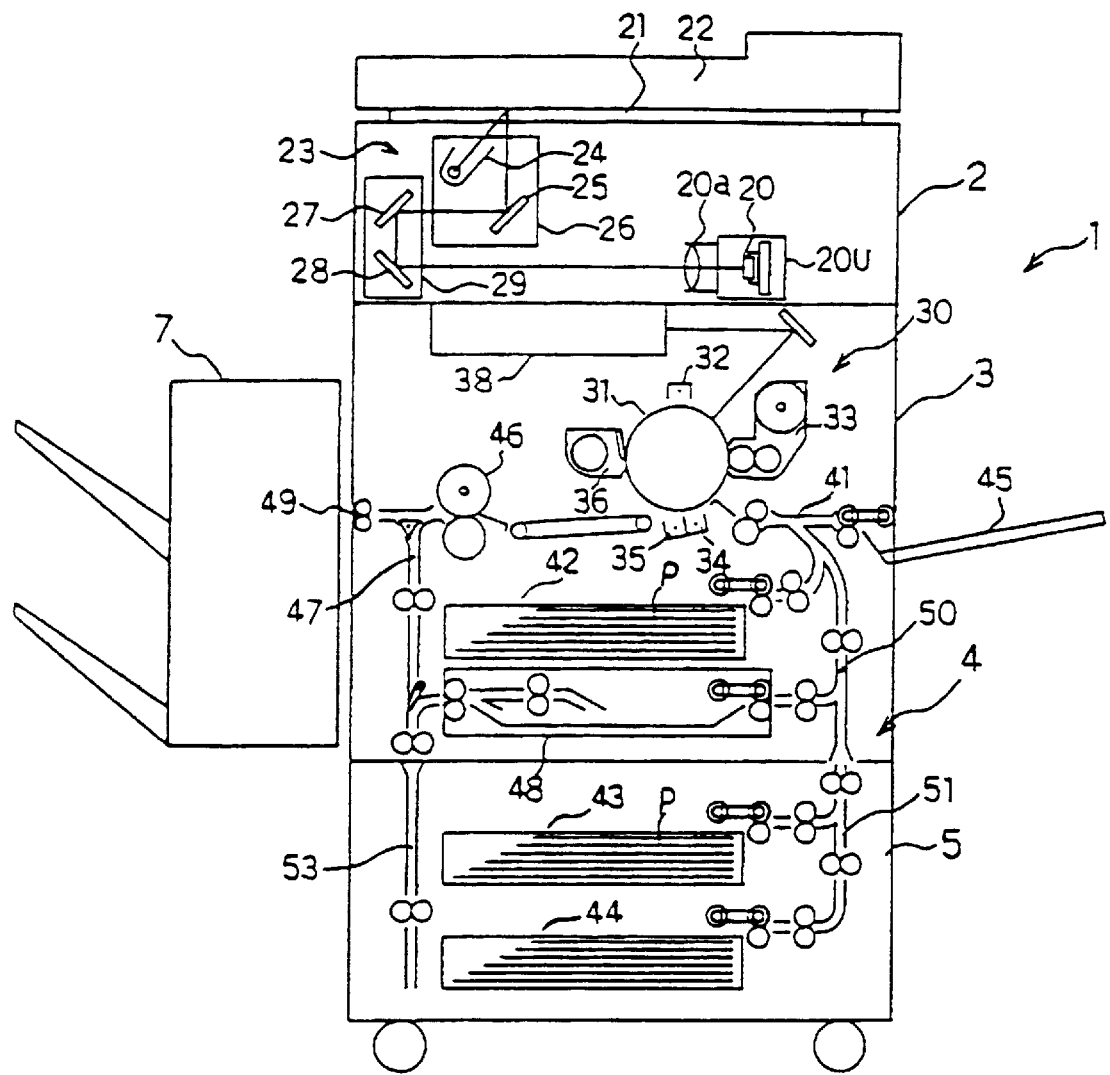
FIG. 3 is a configuration diagram illustrating a structure of a digital copier as an example of an electronic apparatus according to the invention and various components forming the copier.

FIGS. 1 and 2 are perspective views showing an example of a support structure which is an embodiment of the present invention. Especially, FIG. 1 shows upper and lower separate support structures, and FIG. 2 shows a support structure formed by joining and assembling the upper and lower support structures. FIG. 3 shows a general internal structure of a digital copier as an electronic apparatus. Various components forming the digital copier are supported in a space defined by the support structures shown in FIGS. 1 and 2.

Referring first to FIG. 3, a configuration according to the present invention will be described with reference to the digital copier, i.e., digital image forming apparatus, as an example. However, this example is presented only for description and is not limited to the present invention. That is, the present invention can be applied to electronic apparatuses in general and can be applied to electronic apparatuses which are separated depending on functions and are combined to provide improved functions.

The image forming apparatus shown in FIG. 3 is a digital copier 1 which is generally comprised of a scanner portion 2 and a laser recording portion (image forming portion) 3. Further, the image forming portion 3 is comprised of an image recording unit, disposed in an upper stage, for recording and reproducing images on sheets which are recording media supplied from feed trays and a multi-stage feed unit, disposed in a lower stage, containing various recording materials to allow recording materials in different sizes and the like to be selectively supplied to the image recording unit.

Various components forming the digital copier 1 as an image forming apparatus will now be described. First, the scanner portion 2 is comprised of an original document table 21 constituted by transparent glass, a double-side automatic original document feeder (RADF) 22 for automatically feeding original documents on to the original document table 21 and original document image scanning means for scanning and reading images of original documents placed on the original document table 21, i.e., optical scanning means 23. An original document image read by the scanner portion 2 is sent to an image data input portion to be described later as image data, and predetermined image processing is performed on the image data.

The RADF 22 is comprised of an original document tray (not shown) in which a plurality of original documents are set at a time, transport means for automatically transporting the original documents set in the tray one by one to the original document table 21 of the scanner portion 2, means for outputting original documents which have been read, an output tray for receiving output original documents and the like. In order to read one or both sides of original documents with the optical scanning means 23 in accordance with the choice of an operator, the RADF 22 is also comprised of a transport path for single-sided original documents, a transport path for double-sided original documents, transport path switching means, sensors for detecting and managing the state of original documents as they pass through each part, a control portion and the like. The RADF 22 will not be described further because many products of this kind have been applied for patents and merchandized in the past.

The optical scanning means 23 forming a part of the scanner portion 2 for reading an image of an original document on the original document table 21 is comprised of a lamp reflector assembly 24 for exposing an original document on the original document table 21, a first scanning member 26 having a first reflecting mirror 25 mounted thereon for guiding a reflection light image from an original document to a photoelectric conversion element (CCD) 20, a second scanning member 29 having second and third reflecting mirrors 27 and 28 mounted thereon for guiding a reflection light image from the first reflecting mirror 25 to a photoelectric conversion element (CCD), an optical lens 20a for forming a reflection light image from an original document through the above-described reflecting mirrors on the reading element (CCD) 20 forming a part of a reading unit for converting it into an electrical image signal and the above-described CCD 20 for converting a refection light image from an original document into an electrical image signal.

The scanner portion 2 is configured such that original documents to be read are sequentially placed on the original document table 21 by a cooperation of the RADF 22 and optical scanning means 23 and such that a part of the optical scanning means 23 is moved along the bottom of the original document table 21 to read images of the original documents. For this purpose, the first scanning member 26 forming a part of the optical scanning means 23 is driven to travel along the original document table 21 from the left to the right at a constant velocity V, and the second scanning member 29 is controlled to scan in parallel in the same direction at a velocity V/2. As a result, each line of an image of an original document placed on the original document table 21 is formed sequentially on the CCD 20 to read the image.

Read image data acquired by reading an image of an original document with the optical scanning means 23 is sent to the image processing portion and is temporarily stored in a memory of the image processing portion after being subjected to various processes. Then, processed image data in the memory as a result of the image processing is read out in response to an instruction for output. This processed image data is transferred to the image forming portion 3 and is recorded and reproduced as an image on a sheet P which is a recording material.

The image forming portion 3 will now be described. The image forming portion 3 is comprised of a recording material supplying portion 4 for accommodating sheets as recording materials for recording images in each size and for sequentially supplying selected recording materials, a transport system for the sheets as recording materials for forming images thereon and an electrophotographic process portion 30 including laser writing means 38 for forming images.

The laser writing means 38 is comprised of a semiconductor laser light source for emitting laser light in accordance with processed image data read from the memory which has been subjected to image processing after being read by the above-described optical scanning means 23 or image data transferred from an external apparatus, a polygon mirror for polarizing the laser light at a uniform angular velocity, and an f-θ lens for correcting the laser light which has been polarized at a uniform angular velocity such that it is polarized on a photosensitive drum 31 forming a part of the electrophotographic process portion 30 at a uniform angular velocity, and the like.

The electro photoelectric process portion 30 is comprised of a charger 32, a developer 33, a transfer device 34, a peeler 35, a cleaner 36, and a static eliminator (not shown) which are provided in the same order around the well-known photosensitive drum 31.

The recording material supplying portion 4 and sheet transport system are comprised of a supply/transport portion 41 for supplying and transporting sheets P to the above-described electrophotographic process portion 30 for forming images and, particularly, to a transfer position thereof where the transfer device 34 is provided, feeders 42, 43 and 44 for feeding the sheets P selectively and sequentially to the supply and transport portion 41, a manual feeder 45 for feeding sheets in desired sizes as needed, a fixer 46 for fixing images, especially toner images, formed on the sheets P after transfer, a resupply/transport path 47 for resupplying the sheets P after fixing to form images again on the back of the sheets P and a resupply tray as a feeder 48 for resupplying the sheets P tranferred thereto from the resupply/transport path 47 to the image recording portion.

A post-processing device 7 is provided at the left-hand side of the apparatus downstream of the fixer 46 which receives sheets P having images recorded thereon through ejection rollers 49 and performs a predetermined process on the sheets P.

In the digital copier 1 having the above-described configuration, the scanner portion 2 reads an image of an original document and stores it in the image memory as image data; at the laser writing means 38 and electrophotographic process portion 30, the image data is sequentially read from the image memory and is scanned with laser light by the laser writing means 38 to form an electrostatic latent image on the surface of the photosensitive drum 30. The latent image is visualized with toner by the developer 33, and the visualized toner image is electrostatically transferred on to a sheet P transported from any of the above-described sheet feeding trays by the action of the transfer device 34. Thereafter, the toner image is fixed on the sheet P by the fixer 46 and the sheet P is finally ejected to the post-processing device 7 through the ejection rollers 49.

The sheet P having an image thus formed thereon is guided through the resupply/transport path 47 and resupply tray 48 to the electrophotographic process portion 30 when, for example, an image is to be formed again on the rear surface thereof. Alternatively, when it is to be ejected from the apparatus as it is as described above, the sheet P is guided into the post-processing device 7 after passing traveling from the fixer 47 through the ejection rollers 49 and is subjected to a predetermined post-process as needed.

A first embodiment of the present invention will now be described. The first embodiment is a support structure for forming the digital copier 1 as an image forming apparatus.

Particularly, a description will be made on a configuration of a support structure for supporting various components forming the above-described digital copier 1, e.g., the scanner portion 2, image forming portion 3 and recording material supplying portion 4. That is, a detailed description will be made on a structure for supporting the various components of the digital copier 1 shown in FIG. 3.

As described above, the digital copier 1 is constituted by three unit bodies, i.e., the scanner portion 2, the image forming portion 3 which is a laser recording portion and the multi-stage recording material supplying portion 5 forming a part of the recording material supplying portion 4. The digital copier 1 is formed by at least the scanner portion 2 and image forming portion 3.

Therefore, the image forming portion 3 includes a minimum number of, i.e., one feed tray 42 required for reproducing an image on a sheet P and a communication path 50 for feeding sheets supplied from the feed tray 42 into the transport path 41. The resupply/transport path 47, resupply tray 48, the path for the same and the transport means and the like for supplying sheets from the tray are omitted from the basic structure.

Referring to FIG. 3, when the multi-stage recording material supplying portion 5 is to be connected, the above-described resupply/transport path 47, resupply tray 48 and the like are provided at the image forming portion 3 in order to add the function of double-side image formation. A space for this purpose is also reserved at the image forming portion 3. An inverted transport path 53 is provided at the multi-stage recording material supplying portion 5, and there is further provided a communication path 51 in communication with the connection transport path 50 and the like.

As shown in FIG. 3, in addition to the feed tray 42 provided in the basic configuration of the image forming portion 3, the multi-stage supplying unit 5 incorporates the feed trays 43 and 44 separately to allow the supply of sheets in sizes different from those in the feed tray 42. This makes it possible to provide an enhanced function of responding to reproduction of images on many kinds of sheets.

The multi-stage supplying unit 5 includes the communication path 51 in communication with the connection transport path 50 in the vertical direction which meets the transport path 41 in the image forming portion 3 above the same. In addition, the multi-stage supplying unit 5 includes the inversion path 53 in communication with the resupply path 47 for inverted transportation of sheets. The inversion path 53 is formed to add the function of double-side image formation as described above.

As described above, the multi-stage recording material supplying portion 5, resupply tray 48 and resupply/transport path 47 can be added to the digital copier 1 as needed to enhance the function of the same. The addition of the post-processing device 7, automatic original document feeder 22 and the like will provide a copy system which can satisfy various needs.

Referring to units for a system configuration to develop a copy system depending on needs, a plurality of multi-stage recording material supplying portions 5 having different numbers of feeder portions may be prepared, and the post-processing device 7 may be prepared as a post-processing unit incorporating a stapler, a paper folder, a sorter, a puncher, a binder and the like.

As the automatic original document feeder 22, a multiplicity of original document feeders may be prepared including a feeder which accommodates both of double-sided and single-sided original documents, a feeder which accommodates only single-sided original documents and a feeder which circulates original documents.

In such a system configuration, at least the main body of the image forming portion 3 which is a laser recording portion and the body of the multi-stage recording material supplying portion 5 are combined in the example shown in FIG. 3. Such a combination will prevent the support structures from exerting the effect of distortion and the like to the other support structure. For this purpose, as shown in FIGS. 1 and 2, according to the present invention, there is provided support structures for supporting various components forming the image forming portion 3 and various components of the multi-stage recording material supplying portion 5 by combining square hollow members (hereinafter referred to as "square pipes").

Each of various components forming the digital copier 1 as shown in FIG. 3 which is an electronic apparatus is supported in an internal space defined by the support structures fabricated using the square pipes as frames.

First, a description will be made on the support structure for the image forming portion 3 that constitutes the laser recording portion shown in FIG. 3 which is the base of the digital copier 1. The image forming portion 3 is provided such that various components thereof are held in a space defined by a first support structure 100 formed by combining the plurality of square pipes shown in FIG. 1 and securing them using welding or the like.

The first support structure 100 has a configuration wherein a front-side frame 101 assembled by combining and welding, for example, four square pipes 101a, 101b, 101c and a square pipe 107 to be described later and a rear-side frame 102 assembled by combining and welding three square pipes 102a, 102b, 102c and a shorter square pipe 102d are connected by two lower connection square pipes 103 and 104 and one upper connection square pipe 105 by means of welding or the like such that a space in the form of a square rod is defined by the square pipes welded to each other.

The connection square pipes 103 and 104 are secured to the square pipe 107 of the front-side frame 101 at one end thereof and secured to the square pipe 108 by means of welding or the like at the other end thereof. The connection square pipes 103 and 104 constitute joining portions for joining a second support structure 110 to be described later and are fixed such that their lower parts protrude from the square pipe 107 to make the joining area small. Further, the square pipe 107 is fixed such that its bottom surface is flush with the bottom surfaces of the square pipes 101b and 101c. The square pipes 102c and 102d are fixed such that their bottom surfaces are slightly higher than the bottom surfaces of the connection square pipes 103 and 104.

Support plates, various frames, mounting plates and the like are provided in the above-described space defined by the first support structure 100 having such a configuration to support and provided therein the laser scanning means 38, electrophotographic process portion 30, transport path 41, fixer 46, feed tray 42, ejection rollers 49 and the like. In order to satisfy a need for increased versatility of the image forming apparatus achieved by a multiplicity of sheet sizes and a need for a double-side image forming function, the resupply/transport path 47, resupply tray 48 and transport means and the like associated therewith are provided in the space in addition to the above-described components. The image forming portion 3 as a main body is formed by providing and supporting therein the resupply tray 48, the vertical transport path 50 for establishing communication between the feed tray 42 and transport path 41 and the like. This device itself has an image forming function (printing function) for reproducing images on recording materials, and an image forming apparatus (printer) is thus completed as a product.

In the image forming portion 3, positional accuracy must be maintained especially between the laser scanning means 38 and the surface of the photosensitive drum 31 of the electophotographic process portion 30 in view of distortion and the like of images recorded and reproduced thereby. For this purpose, the laser scanning means 38 and electrophotographic process portion 30 are positioned and held in the space in the same support structure 100 such that they are less susceptible to the effect of distortion of the first support structure 100 and the like and are kept in a predetermined positional relationship.

Various components forming the scanner portion 2, i.e., a support structure supporting components including the optical scanning means 23 and the like is mounted on the upper surface of the first support structure 100. The scanner portion 2 is provided such that a part of the bottom thereof is supported in contact with the regions of the square pipes 101a and 102a on the upper surfaces of the front-side frame 101 and rear-side frame 102 of the first support structure 100 as shown in FIG. 2. Thus, the digital copier 1 is configured as a whole and is completed as a product.

Next, a description will be made on a second support structure which serves as the base of the multi-stage recording material supplying portion 5 provided under the image forming portion 3, i.e., a second support structure 110 for supporting various components forming the multi-stage recording material supplying portion 5 shown in FIG. 3.

As shown in FIG. 1, the multi-stage recording material supplying portion 5 also has a configuration in which various components forming the supplying portion are contained and supported in a space defined by the second support structure 110 formed by combining a plurality of square pipes and welding and joining them.

The second support structure 110 has a configuration in which a front-side frame 111 formed by welding four square pipes into a rectangular configuration and a rear-side frame 112 similarly formed by welding four square pipes into a rectangular configuration are welded together through two lower connection square pipes 113 and 114 and one upper connection square pipe 115 to define a required space. Support plates, frames, mounting plates and the like are provided in the space defined by the square pipes of the second support structure 110 to support the feed trays 43 and 44 which are components forming the supplying portion 5, the sheet transport path 51 and the path 53 constituting the inversion transport path, and the multi-stage recording material supplying portion 5 is thus configured.

Especially, the square pipes 111a and 112a at an upper part of the front-side and rear-side frames 111 and 112 form joining portions where they are joined to the connection square pipes 103 and 104 of the above-described first support structure 100.

The inversion transport path 53 is provided to form images on both side of a sheet as described above. The inversion transport path 53 is not provided where the double-side image formation function is not required.

A description will now be made on a configuration wherein the first support structure 100 is positioned and placed on the second support structure 110 to provide the image forming apparatus held and configured in the space defined by the first support structure 100 with an enhanced function of supplying paper in various sizes and especially forming images thereon. This makes it possible to complete the product of the image forming apparatus that can accommodate various sizes.

On the upper surfaces of the front-side frame 111 and rear-side frame 112 forming the second support structure 110, there is provided four contact surfaces 116, 117, 118 and 119 (shaded regions in the figure) which is a part of a surface to which a part of the bottom of the first support structure 100 as the base of the image forming portion 3 including the laser irradiation means 38 is joined in contact therewith. The four contact surfaces 116, 117, 118 and 119 are set such that they are located on the upper surfaces of the upper square pipe 111a forming a part of the front-side frame 111 and the upper square pipe 112a forming a part of the rear-side frame 112. They are put in contact with four parts of the bottom of the two lower connection pipes 103 and 104 forming the first support structures 100 which is the base of the image forming portion 3.

Specifically, as shown in FIG. 1 in detail, the support structures 100 and 110 are joined in contact with each other such that the square pipes 103 and 104 forming the first support structure 100 and the square pipes 111a and 112a forming the second support structure 110 are in an orthogonal relationship with each other to make the contact area as small as possible. This minimizes influences such as distortion and vibration between the support structures 100 and 110 to eliminate misalignment and the like attributable to various components supported by them, which makes it possible to provide the digital copier 1 as a reliable product that can accommodate various sizes.

The following problem will occur when a square pipe forming a part of the first support structure 100 and a square pipe forming a part of the second support structure 110 which are parallel with each other, e.g., the square pipes 107 and 111a, are joined in contact with each other in a large area on the surfaces thereof in one longitudinal direction. In such a configuration, when the support structures 100 are placed on and joined to the structure 110, sufficient planarity and linearity must be maintained on the surfaces thereof in contact with each other. Otherwise, they are joined in regions of there the square pipes which are raised, twisted or distorted. This results in partial floating and distortion which disable accurate positioning and the like when the pipes are joined to make it impossible to keep them in an accurate positional relationship. In addition, when they are joined with a connection member or the like, an excessive force acts between the support structures 100 and 110 after they are joined. In the worst case, this can cause distortion and the like of the support structures 100 and 110 under the effect of the twisting and distortion exerted between them as described above.

This significantly affects (distorts) the positional relationship between various components supported by either the support structure 100 or 110 in a predetermined relationship and causes a reduction in image quality attributable to misalignment of an image or sheet and the like in the image forming apparatus.

In this regard, when the first and second support structures 100 and 110 are assembled and joined in a vertical relationship according to the present invention, the above-described problem can be eliminated because the square pipes are positioned and joined in an orthogonal relationship with each other as described above. Specifically, since the area of the joining portion where they are in contact with each other is a very small area as indicated by the shaded region which is defined at least when the square pipes are orthogonal to each other, the effect of distortion and the like on planarity and linearity is minimized. The use of square pipes as a frame promotes the effect of preventing distortion.

Positioning pins 120 for positioning the first support structure 100 of the image forming portion 3 in a predetermined state, namely a positional relationship, are provided on contact surfaces 116 and 117 on the upper surface of the square pipe 111a of the second support structure 110 of the multi-stage recording material supplying portion 5 for joining the first support structure 100 thereto. Positioning holes 121 shown in FIG. 4 are formed in association with the positioning pins 120 at the square pipes 103 and 104 of the first support structure 100 of the image forming portion 3 in an orthogonal relationship with the square pipe 111a of the second support structure 110 of the multi-stage recording material supplying portion 5. As a result, they are joined with their vertical positional relationship maintained as a result of the engagement between the positioning pins 120 and positioning holes 121.

The positioning pins 120 and positioning holes 121 constitute a positioning member and may be provided in reverse. However, the positioning pins 120 will hinder the first support structure 100 from supporting various components of the image forming portion 3 to form the main body of an image forming apparatus, and the positioning holes 121 will not act as such obstacles. Further, the formation of the positioning holes 121 allows the supplying portion 5 to be incorporated as needed and allows it to be accurately positioned free from the mutual effect of twisting, distortion and the like during joining.

Thus, the positioning pins 120 and positioning holes 121 are provided in two locations on the upper surface of the upper square pipe 111a forming a part of the second support structure 110 instead of being provided on all of the joining surfaces 116 through 119 in the figure. The reason is that the first and second support structures 100 and 110 are vulnerable to the effect of distortion and the like exerted acting therebetween as described above when they are provided in four locations for positioning. In order to prevent this, they are provided at least in two locations.

Among the square pipes forming the second support structure 110 as described above, the positioning pins 120 in two locations are provided on the same surface of either the square pipe 111a or 112a which is in parallel with the transport direction of sheets supplied from the feed trays 43 and 44 supported by the support structure 110.

In general, the sheet transport direction is the longitudinal direction of the apparatus, and the positioning pins 120 are provided in two locations on the square pipe 111a of the second support structure 110 in the longitudinal direction thereof. This makes it possible to keep the upper and lower, i.e., first and second support structures 100 and 110 in a parallel relationship with each other when they are joined.

As a result, sheets P sequentially sent out from the multi-stage recording material supplying portion 5 are fed to the image forming portion 3 in a predetermined relationship. At this time, images recorded on the sheets P are faithfully reproduced without being skewed on the sheets P.

Figure 5:
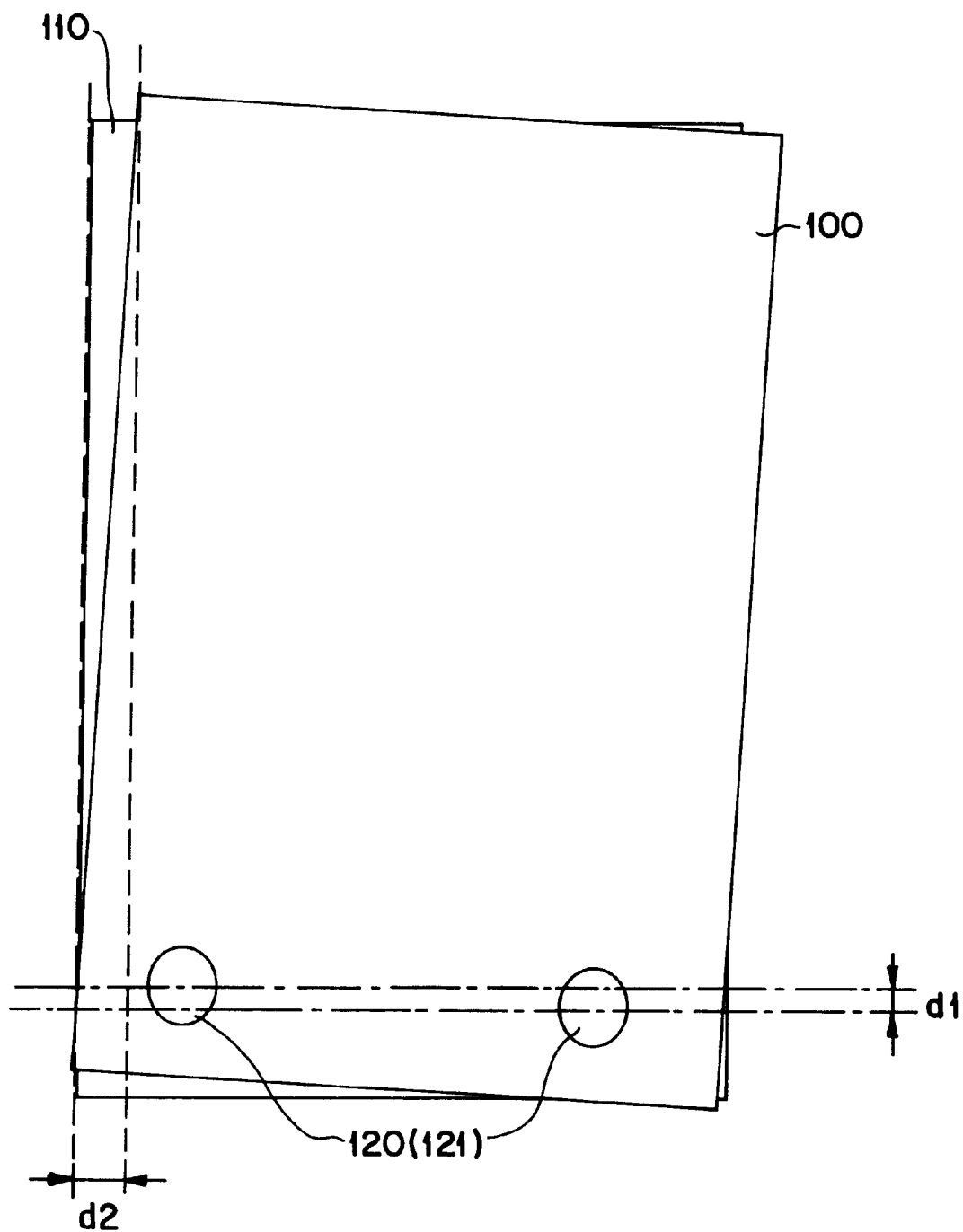
FIG. 5 is a schematic view illustrating the relationship between the positioning of the first and second support structures and the amount of misalignment.

For example, when the positioning pins 120 are provided at the portions 117 and 119 joined to the first and second support structures 100, 110, they are in a direction orthogonal to the feeding direction of the sheets P, i.e., the lateral direction thereof, which leaves a possibility of causing skewed feed and the like when the fed sheets P are received. More specifically, when the positioning pins 120, i.e., the positioning members, are provided in the lateral direction orthogonal to the feeding direction as shown in FIG. 5, if the amount d1 of misalignment between the upper and lower support structures 100 and 110 attributable to an error or the like is 1 mm, the amount d2 of misalignment between the upper and lower support structures 100 and 110 in the feeding direction, i.e., the longitudinal direction, is greater than 1 mm. As a result, fed sheets P can be skewed in the transport path at the upper first support structure 100.

Conversely, when the positioning pins 120, i.e., positioning members, are provided on the square pipe 111a in parallel with the feeding direction which is the longitudinal direction, as described with reference to FIG. 5, if the amount d2 of misalignment attributable to an error or the like is 1 mm, the amount d1 of misalignment in the lateral direction becomes smaller to increase the accuracy of the positional relationship between the upper and lower, i.e., first and second support structures 100 and 110. When the positioning members (120 and 121) are provided in the same direction as the feeding direction, the positional relationship becomes quite preferable, which makes it possible to eliminate skewed feed and the like and to feed the sheets P preferably.

The positioning members are therefore provided in positions where the first and second support structures 100 and 110 are joined to each other. In addition, they are provided at the two joining portions 116 and 117 which are at a longer distance from each other and are in the longitudinal direction of the square pipe 111a in FIG. 1. If the distance between the joining portions 117 and 119 or between the joining portions 116 and 118 is longer than the distance between the joining portions 116 and 117, the positioning members may be provided at such positions to minimize the amount of misalignment.

In order to provide the positioning members in two points aligned the feeding direction of sheets, the upper and lower support structures 100 and 110 may be assembled such that the distance between the joining portions as described above is longer in the direction in which the sheets are transported.

With the above-described configuration, a single integrated support structure 10 can be provided by connecting the upper and lower, i.e., first and second support structures 100 and 110 positioned with the positioning pins 120 and positioning holes 121 and joining and fixing them in the positions of the respective joining surfaces 116 through 119. This serves as a support structure 10 of the digital copier 1 having the configuration shown in FIG. 3 as a copying system. The digital copier 1 can be provided by containing, supporting and holding the various components shown in FIG. 3 in the respective spaces.

Figure 4A:
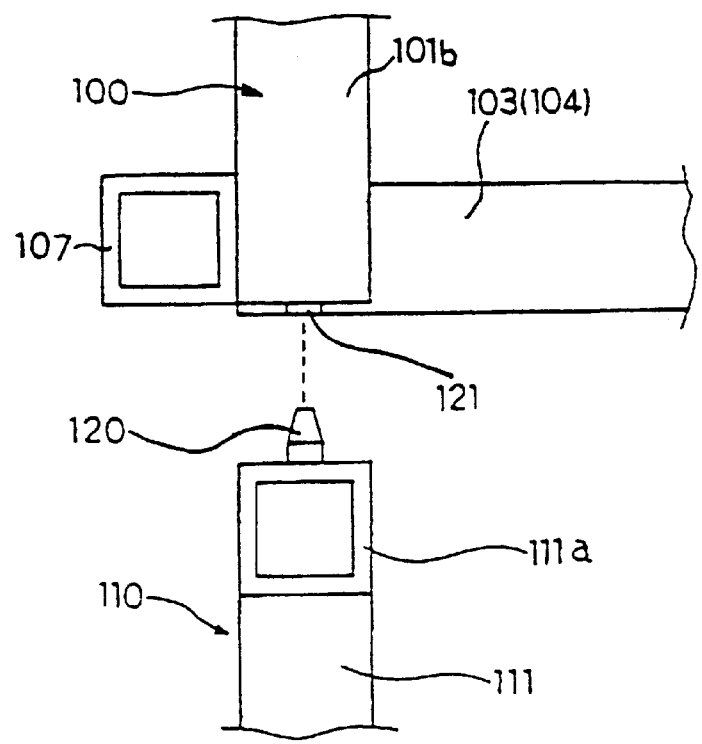
FIGS. 4A and 4B illustrate positioning of the first and second support structures in FIG. 1.
Figure 4A:
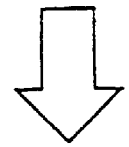
Figure 4B:
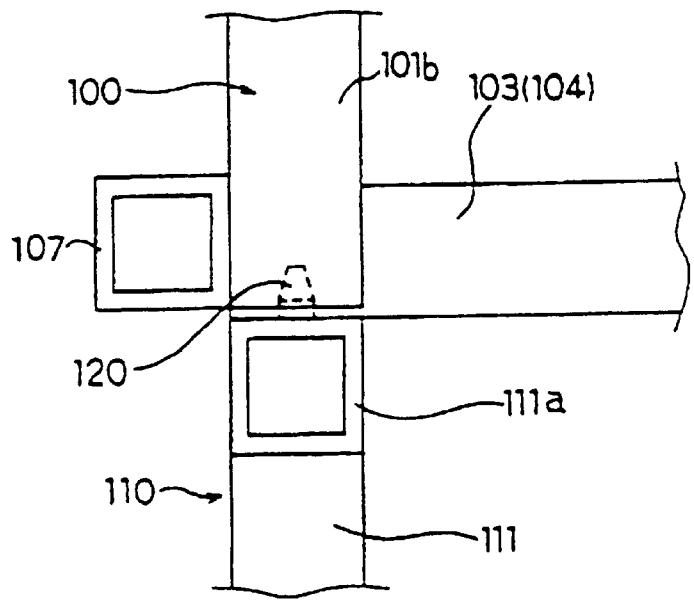

FIG. 2 shows the integrated support structure 10 in a state in which the upper and lower, i.e., first and second support structures 100 and 110 shown in FIG. 1 are joined, and FIGS. 4A and 4B show major parts where the first and second support structures 100 and 110 are joined as viewed in the direction of the arrow A in FIG. 2. Specifically, the structures are joined and fixed using a connecting member which is not shown as shown in FIG. 4B with the positioning holes 121 provided on the bottom of each of the square pipes 103 and 104 of the first support structure 100 positioned at the positioning pins 120 provided on the upper surface of the square pipe 111a of the second support structure 110.

The scanner portion 2 is mounted on an upper part of the first support structure 100, which completes the digital copier 1 as a system in which positional accuracy is established for each unit thereof.

As described above, the integrated support structure 10 is provided as a square pipe frame formed by the first support structure 100 and second support structure 110 which is a combination of a plurality of square pipes in a separated configuration for containing and supporting, for example, the various components described with reference to FIG. 3 that form the digital copier 1. When the first and second support structures 100 and 110 are joined, the contact area between the support structures is made as small as possible to prevent the first and second support structures 100, 110 from causing distortion on each other.

When the first and second support structures 100 and 110 are joined, as shown in FIG. 1, they are assembled such that the square pipes at the joining portion are orthogonal to each other. When they are joined as shown in FIG. 2 in doing so, the square pipes 101b, 101c, 102b, 102c and 102d forming the front and rear frames 101 and 102 of the first support structure 100 are joined with the upper square pipes 111a and 112a forming the second support structure 110 in contact therewith. This results in a large joining area and causes the above-described problem.

Specifically describing with reference to FIGS. 4A and 4B, for example, this is avoided by providing the first support structure 100 such that the connection square pipes 103 and 104 thereof joined to the joining surfaces 116 through 119 of the square pipes 111a and 112a of the second support structure 110 protrude below the square pipes 101b, 101c, 102b, 102c and 102d forming the first support structure 100, i.e., such that they protrude toward the second support structure 110. As a result, as shown in FIG. 4B, the square pipes 101a, 101b, 102a, 102b and 102c will not contact the square pipes 111a and 112a when the first and second support structures are joined, which eliminates the above-described problem associated with an increased contact area.

Especially, according to the present embodiment, the square pipes 103, 104 or 111a, 112a forming at least either of the support structures are provided such that they protrude above other square pipes forming the respective support structure 100 or 110 to prevent contact in regions other than the joining portion in order to minimize the joining area between the support structures connected to each other as shown in FIGS. 4A and 4B. This makes it possible to suppress the joining area and minimize the joining area when they are orthogonal to each other.

While the present embodiment has referred to the first support structure 100 to serve as the base of the image forming portion 3 and the second support structure 110 to serve as the base of the multi-stage recording material supplying portion 5, many other units configuring a copying system are prepared as described above. Therefore, the present invention may be applied to separate support structures for such units.

According to the above description, among the square pipes of the first support structure 100 for the image forming portion 3 and the square pipes of the second support structure 110 for the multi-stage recording material supplying portion 5, square pipes which are in a face-to-face relationship and are orthogonal to each other are joined at the joining surfaces 116 through 119. However, what is necessary is only to put the square pipes in contact with each other such that the contact area is minimized, and it is therefore possible to configure the support structures with square pipes and to change the configuration of the square pipes.

A modification of the first embodiment of the invention will now be described.

The square pipes forming the first and second support structures 100 and 110 shown in FIGS. 1 and 2 for containing and supporting various components forming the digital copier 1 according to the present invention are generally manufactured by shaping a flat sheet H into the form of a round pipe which is then joined at both ends thereof. Any unnecessary part of a bonded portion HP is cut away as needed and surface processing is carried out. Such a round pipe is put in a mold for forming a square pipe to form a square pipe. Therefore, each of the square pipes has a bonded portion HP as shown in FIG. 6.

A bonded portion HP is present on one of the four surfaces of a square pipe thus manufactured. It is assumed that a surface having a bonded portion HP is most vulnerable to distortion. Therefore, when square pipes are combined into the first support structure 100 or second support structure 110 which are in turn joined into the single integrated support structure 10 as shown in FIG. 6, a consideration is paid such that the surface having a bonded portion HP of each pipe is not joined. This makes it possible to eliminate the effect of distortion and the like as described above. When the support structures 100 and 110 are combined, a consideration is paid such that bonded portions HP of square pipes will not face each other where they are joined, i.e., at the contact region. Such a consideration will eliminate the effect of distortion and the like, thereby improving positional accuracy further.

Figure 6:
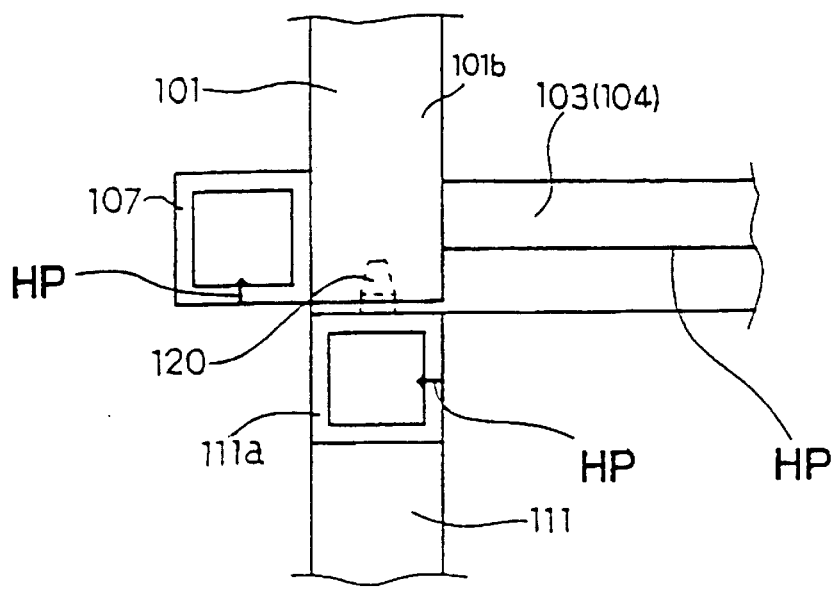
FIG. 6 is a view illustrating the support structures and a state of combination therebetween taking into consideration joining portion formed during the manufacture of square pipes forming the first and second support structures according to the invention.

Referring to FIG. 6, especially the connection square pipe 104 is welded to the square pipe 101b as shown in FIGS. 1 and 2. During the welding, a bonded portion HP as described above is not welded in a face-to-face relationship with the square pipe 101b, and a bonded portion HP on the square pipe 101b is not also welded in contact with the surface of the connection square pipe 104.

Figure 8A:
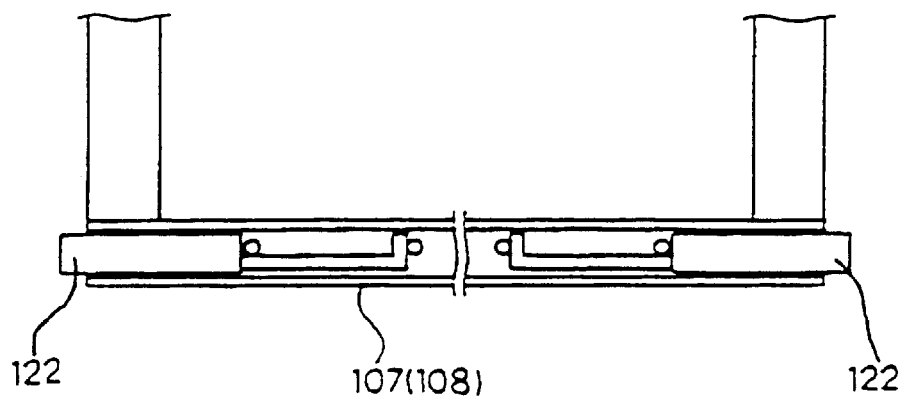
FIGS. 8A and 8B are views showing an example of a configuration in which the carrying handles shown in FIG. 7 are moved into and out of a space inside square pipes.
Figure 8B:
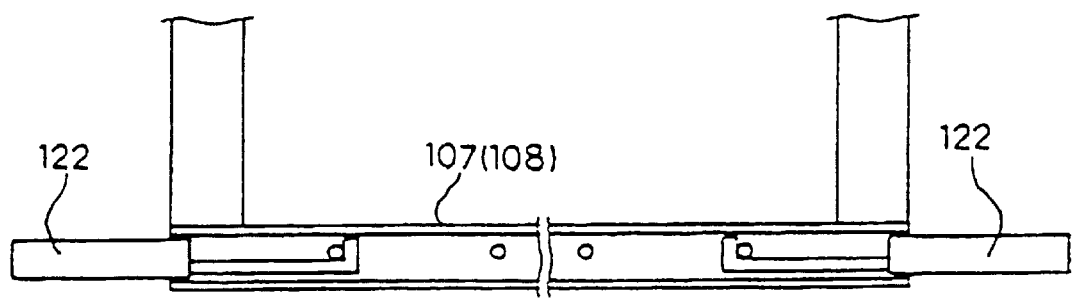

In the embodiment of the invention, the first support structures 100 and second support structures 110 maintained in a vertical relationship with each other are joined, and various components forming a copying system are contained and supported in a space defined by them. In consideration to the ease of carrying those support structures and in order to minimize distortion occurring at the support structures during the transportation of the same or distortion occurring, for example, in the case where an apparatus in which components of the image forming portion 3 is contained and supported by the support structure is transported and joined to the other support structure 110, handles 122 to allow the support structure 100 to be lifted in a stable state for transportation, as shown in FIGS. 8A and 8B, are provided in a face-to-face relationship in four locations in spaces in a pair of parallel square pipes 107 and 108 forming a part of the first support structure 100.

Figure 7:
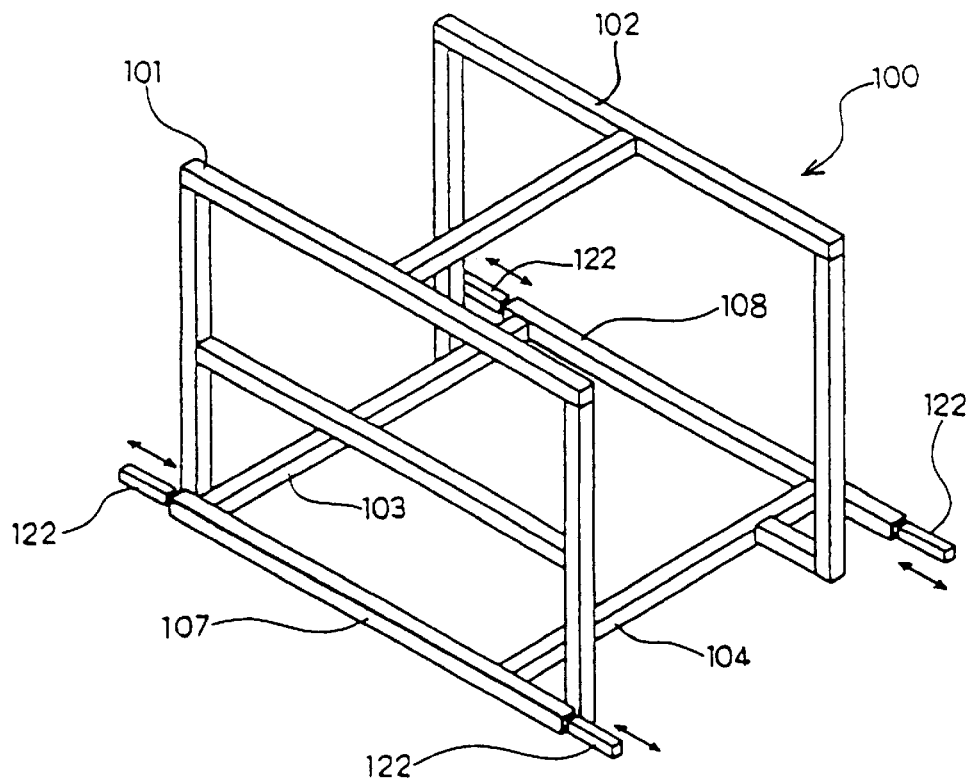
FIG. 7 is a view illustrating a modification to the first embodiment of the present invention and showing a state of carrying handles provided to allow support structures to be carried in a stable state.

As shown in FIG. 7, the handles 122 are pulled out from the respective square pipes 107 and 108 to predetermined positions, and the first support structure 100 is lifted to be joined to the other, i.e., the second support structure 110 in contact with predetermined positions of the square pipes 111a and 112a thereof. This makes it possible to easily join them in a positioned state without the effect of distortion and the like of the first support structure 100.

When the first support structure 100 containing and supporting a part or all of the components of the image forming portion 3 therein is positioned relative to the second support structure 110 and joined thereto, it is also possible to configure them into a copying system comprising a plurality of units without reducing the positional accuracy of various components supported in respective positions.

Figure 9:
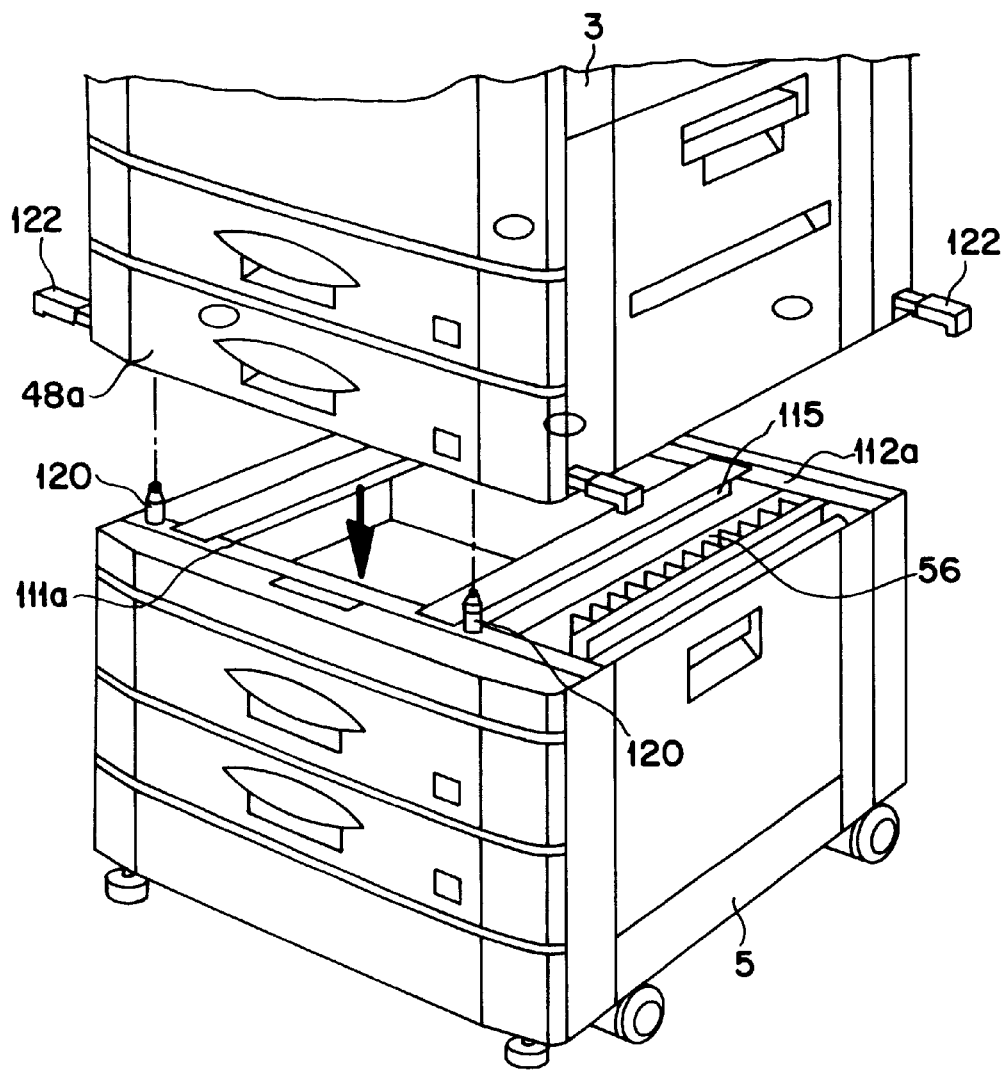
FIG. 9 is a perspective view showing an example of a joined state according to a mode in which devices formed by various components assembled into first and second support structures according to the invention are integrated to provide improved functions.

For example, as shown in FIG. 9, the image forming portion 3 assembled by supporting components for image formation in the first support structure 100 and mounting a jacket and the like thereon is placed on the multi-stage recording material supplying portion 5 assembled by containing the feed trays 43 and 44 and the like in the second support structure 110 and mounting a jacket and the like thereon such that the positioning members and, more particularly, the positioning pins 120 are fitted into the positioning holes 121. A portion 48a and the like associated with the resupply unit 48 are pulled out, and the first and second support structures 100 and 110 are fixed with, for example, a connecting member. Alternatively, they may be fixed by connecting them to each other at the connecting positions at the regions of the handles 122 of the apparatus.

While the above-described handles 122 can be used to carry the support structure 100 and the like in this case, they can be also used as they are as handles for carrying the body of a digital copier 1 which is configured by joining the first and second support structures 100 and 110 into the integrated support structure 10, i.e., by joining, connecting and fixing them as shown in FIG. 9.

The above description of the first embodiment of the present invention is based on an assumption that the configuration includes the feeding portion 4 for feeding sheets in many different sizes shown in FIG. 3. When only the image forming portion 3 is to be provided, however, a printer that enables a printing function of an image forming apparatus can be fabricated by supporting various components in a space defined by the first support structure 100. The support structure 100 may be used as it is and may be combined with the second support structure 110 that defines a space for supporting various components of the feeding portion 3 to configure the integrated support structure 10, thereby making it possible to provide a printer capable of forming images on plural kinds of sheets in different sizes.

Furthermore, a digital copier 1 as shown in FIG. 3 can be fabricated by using the above-described support structure 100 and the like as they are and joining a support structure for supporting various components of a scanner portion 2 to be described later joined thereto. Thus, the same support structures separated depending on functions can be used as they are to provide a printer and digital copier without providing separate support structures to be exclusively used for such purposes. They may be joined to fabricate an integrated support structure to support various components which can accommodate various apparatuses including printers and digital copiers.

A second embodiment of the present invention will now be described.

The above-described first embodiment has referred to an example of a support structure in which a feeding portion 4 capable of feeding plural kinds of sheets in different sizes is configured separately.

A description will now be made on a support structure for a digital copier 1 having a scanner portion as an image forming device as a second embodiment of the present invention.

Specifically, the image forming device itself uses the above-described support structure 100 and the like as they are. A description will be made here on the features of a support structure for supporting components forming a scanner portion 2.

A description will be made on a support structure which is provided on an integrated support structure 10 formed by combining first and second support structures 100 and 110 supporting components of an image forming portion of an image forming device as described above. This support structure may be configured for a scanner portion 3 alone and is provided separately from the body of the image forming device. It can be combined with the body of the image forming device as needed to fabricate a digital copier 1.

In the scanner portion 3, there is provided a reading unit 20U constituted by a CCD 20, a lens 20a and the like for reading an image of an original document placed on a transparent original document table 21 to form the image of the original document on a light-receiving surface of the CCD 20 of the unit 20U. Thus, the optical path of light reflected from the original document up to the CCD 20 is not shifted, and the image of the original document can be optically scanned by moving first and second scanning members 26 and 29 as previously described in parallel with the original document table 21. The supporter supporting the reading unit 20U comprised of the CCD 20, lens 20a and the like must be secured to and supported at a region which is free from vibration, misalignment, distortion, twisting and the like.

A detailed description will be made on a configuration of the support structure for the scanner portion 3 to achieve such a purpose. The scanner portion 3 here will be described with reference to an example of a configuration in which an image of an original document is optically formed on the CCD 20 or the like forming a part of the reading unit. However, the present invention is not limited to such a scanner portion.

Figure 11:
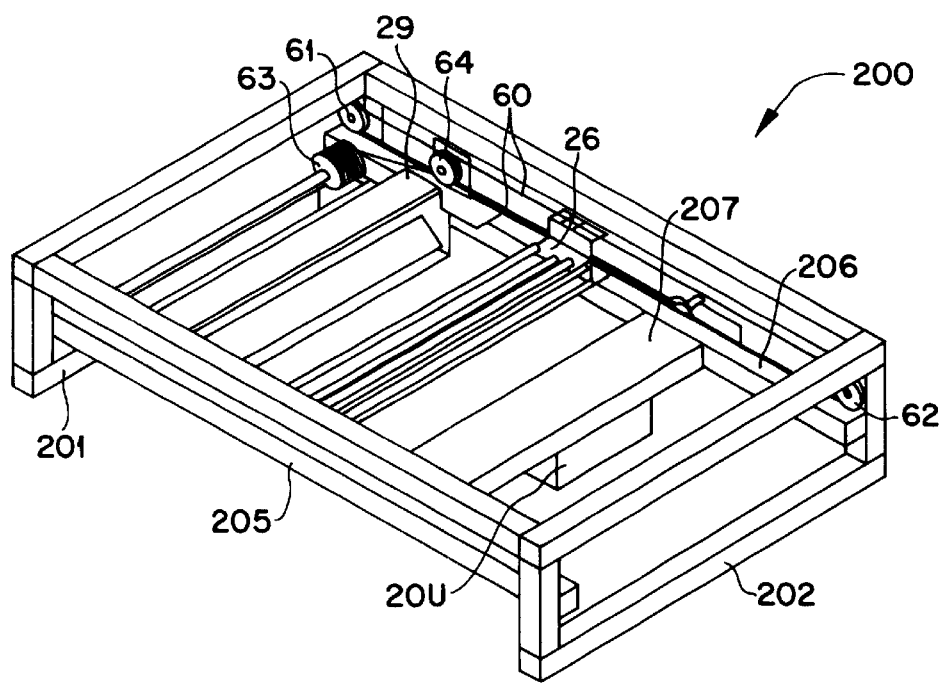
FIG. 11 is a perspective view showing a state in which various components of a scanner portion as an image forming device are actually supported by the support structure shown in FIGS. 10A through 10C.
Figure 12:
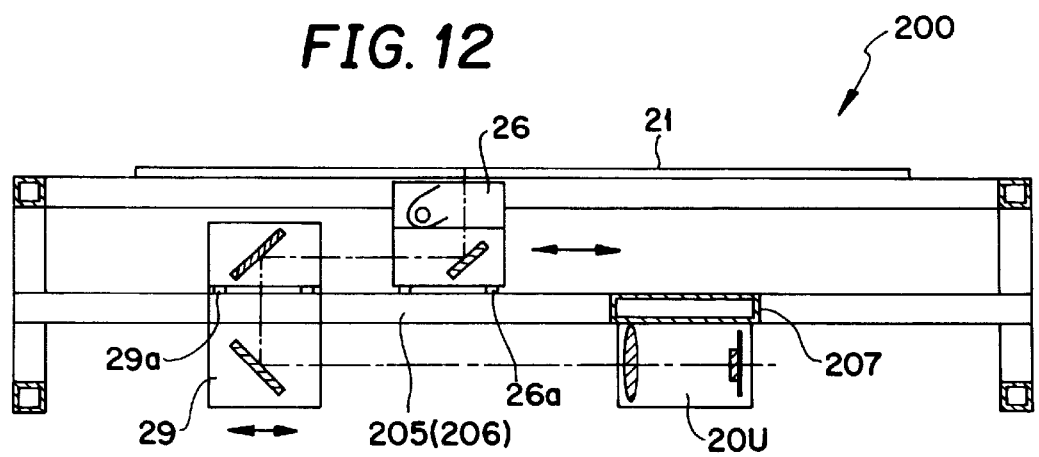
FIG. 12 is a plan view of the support structure shown in the perspective view in FIG. 11.

FIGS. 10A through 10C show an example of a support structure 200 which defines a space for supporting various components forming the scanner portion 3. FIGS. 11 and 12 respectively show a perspective view and a plan view illustrating a state in which the support structure 200 actually supports a first scanning member 26, a second scanning member 29 and optical scanning means 23 which is the reading unit comprising the lens 20a and CCD 20 which are components forming the scanner portion 2.

Referring to FIGS. 10A through 10C, the support structure 200 for supporting the optical scanning means 23 is formed by securing two frames 201 and 202 formed by combining four hollow square pipes to each other with two connection square pipes 203 and 204 at upper portions thereof to define a space for containing and supporting various components forming the optical scanning means 23.

The support structure 200 further includes two support square pipes 205 and 206 secured in parallel between the frames 201 and 202 for directly or indirectly supporting the first and second scanning members 26 and 29 forming the optical scanning means 23 and comprises a support square pipe 207 for directly or indirectly supporting the reading unit 20U secured between the support square pipes 205 and 206.

The support square pipes 205 and 206 are provided to support the first and second scanning members 26 and 29 of the optical scanning means 23 as described above, and the support square pipe 207 is for supporting the lens 20a and CCD 20 that constitute the reading unit 20U.

Specifically, as shown in FIG. 9 and FIGS. 10A through 10C, the first and second scanning members 26 and 29 are supported on the upper surfaces of the support square pipes 205 and 206. The first and second scanning members 26 and 29 include members 26a and 29a such as rollers to move smoothly on the upper surfaces of the support square pipes 205 and 206. In order to drive the first and second scanning members 26 and 29 for a travel in the same direction, a driving wire 60 is stretched between pulleys 61 and 62 rotatably supported on the frames 201 and 202 and a drive pulley 63 for driving the stretched wire 60 is secured to, for example, a drive shaft rotatably supported between the support square pipes 203 and 204 to transmit the rotary force of a drive motor or the like which is not shown to the drive pulley 63.

In order to drive the second scanning member 29 for a travel at a velocity V/2 relative to a traveling velocity V of the first scanning member 26, a pulley 64 is rotatably provided; the wire 60 is appropriately wound around each of the pulleys 61, 62, 63 and the pulley 64; and the wire 60 is secured to the first scanning member 26 in the middle thereof. Such a configuration is well known and does not characterize the present invention by itself. When the drive pulley 63 is rotated in the forward direction, the first scanning member 26 is driven for a travel to the right in FIG. 12 at the velocity V, and the second scanning member 29 is driven for a travel in the same direction at the velocity V/2.

In such a configuration, the first and second scanning members 26 and 29 are supported by the support square pipes 205 and 206 forming the support structure 200 and are capable of optically scanning an original document placed on the original document table 21 as shown in FIG. 12.

As a result of the scan, it is possible to form an image on the CCD 20 of the reading unit 20U secured to the support square pipe 207 through the lens 20a provided in front of the same to optically read the image.

Although not shown, the original document table 21 is supported on the connection square pipes 203 and 204 and the like forming the support structure 200 through another supporting means.

In the scanner portion 2, it is important to accurately maintain the positional relationship between the reading unit 20U including the CCD 20 for reading images, and the first and second scanning members 26 and 29 for optically scanning images of original documents. That is, when distortion and the like occur on the supporting surfaces of the support square pipes 205 and 206 when the first and second scanning members 26 and 29 for scanning original documents travel thereon, accurate reading is obviously disabled because of vibration and the like.

While the first and second scanning members 26 and 29 have been described as being supported on the upper surfaces of the support square pipes 205 and 206 in the present embodiment, when separate supporting means is provided on the support square pipes 205 and 206 to support the first and second scanning members 26 and 29, vibration and the like are obviously caused if there is distortion and the like at the support square pipes 205 and 206. This equally applies to the support square pipe 207.

In order to prevent this, according to the present embodiment, the support square pipes 205 and 206 serving as a reference and the pipe 207 are secured to a positioning jig prepared in advance, and the support square pipes 205 and 206 are joined to the pipe 207 and are bonded thereto by means of welding or the like. After the bonding, both of the frames 201 and 202 are respectively joined to ends of the support square pipes 205 and 206 serving as a reference and bonded thereto by means of welding or the like and, further, the connection pipes 203 and 204 are combined. When they have been combined, the support square pipes 205, 206 and 207 serving as a reference are removed from the positioning jig to complete a support structure 200 having a configuration as shown in FIGS. 10A through 10C.

Figure 13:
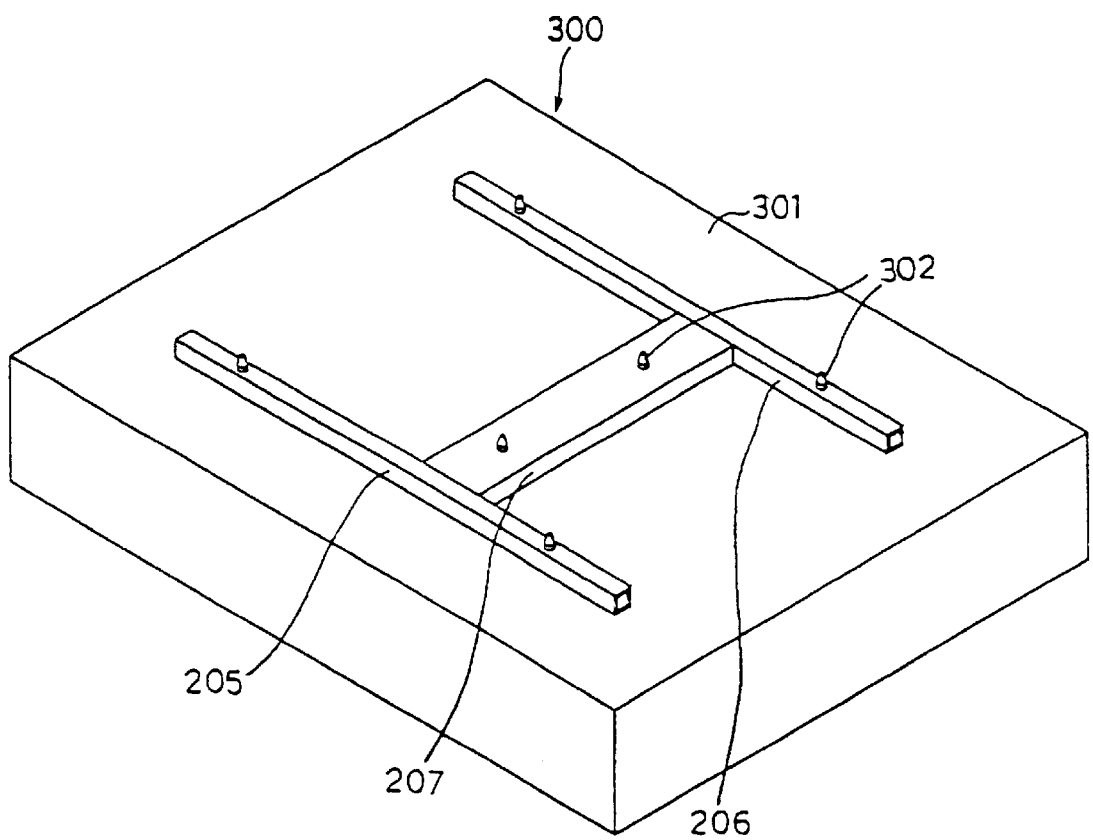
FIG. 13 is a perspective view showing an example of a positioning jig used for the fabrication of the support structure for a scanner portion according to the second embodiment of the present invention.

The support square pipes 205, 206 and 207 thus serving as a reference are engaged with pilot pins 302 provided to protrude from a reference surface of a reference base 301 of a positioning jig 300 as shown in FIG. 13 to be positioned on the reference base 301. For this purpose, the reference support square pipes 205, 206 and 207 are formed with holes in positions associated with the pilot pins 302 in advance. The square pipes 205, 206 and 207 positioned and supported on the reference base 301 are secured and held in those positions with fixing means (not shown). The joining portions between both ends of the support square pipe 207 and the support square pipes 205 and 206 are bonded by means of welding or the like while they are secured to the positioning jig 300.

The support square pipes 205, 206 and 207 are removed from the positioning jig 300 shown in FIG. 13 and are secured again to a jig for bonding the both frames 201 and 202 further, and the both frames 201 and 202 are also secured to another positioning jig to align the surfaces thereof on which they are joined. The joined portion is bonded by means of welding or the like in this state, and the connection square pipes 203 and 204 are also positioned and bonded simultaneously to complete the support structure 200.

This makes it possible to accurately maintain the positional relationship between the support square pipes 205, 206 and 207 and the like, thereby eliminating the possibility of propagation of distortion, twisting and the like to the support square pipes 205, 206 and 207 during bonding. It is therefore possible to maintain a constant positional relationship between the first scanning member 26 and second scanning member 29 forming the optical scanning means 23 supported by the support square pipes 205, 206 and 207 and the components of the reading unit 20U.

A description has been made on an example wherein a support structure 200 as shown in FIGS. 10A through 10C is completed using support square pipes 205, 206 and 207 as a reference. The positional relationship between the components of the optical scanning means 23 is accurately maintained using the support square pipes as a reference that support it directly or indirectly, which can be modified in various ways. For example, in order to maintain the positional relationship between the imaging lens 20a and CCD 20 which constitute the reading unit 20U, the support square pipe 207 supporting the same is chosen as a reference; the square pipe 207 is secured to a positioning jig for this purpose; and the support square pipes 205 and 206 are first appropriately bonded by means of welding or the like. Then, bonding as described above may be carried out to fabricate the support structure 200 shown in FIGS. 10A through 10C.

In order to accurately maintain the positional relationship between the first and second scanning members 26 and 29 forming the scanning means, the support square pipes 205 and 206 supporting the same are secured to a positioning jig in advance, and the support square pipe 207 is first bonded by means of welding. Then, the both frames 201 and 202 and the like as previously described are bonded to fabricate the support structure 200. When an image on an original document is read while transporting the same utilizing the transport function of the RADF 22 and the like, the first and second scanning members 26 and 29 are fixed. Since the first and second scanning members 26 and 29 are stopped at predetermined positions to be positioned there for this purpose, the positional relationship can be maintained without any effect of distortion and the like if the support structure 200 is fabricated using especially the support square pipes 205 and 206 and the like as a reference.

The support structure 200 for configuring the scanner portion 2 independently can be provided as described above and, for example, the support structure 200 can be assembled using the support square pipes 205, 206 and 207 and the like for supporting the first and second scanning members 26 and 29, reading unit 20U and the like which must be positioned accurately as a reference. This makes it possible to support various components while maintaining them in a predetermined positional relationship free from the effect of distortion and the like. As a result, reading can be preferably performed for improved accuracy.

A modification of the support structure for the scanner portion will now be described.

The support structure 200 for containing and supporting components forming the optical scanning means 23 as shown in FIGS. 11 and 12 has been described with reference to an example wherein support is directly provided by the support square pipes 205 and 206 which serves as a reference for the scan and travel of the first and second scanning members 26 and 29 for optically scanning an original document as described above. In such a case, since the first and second scanning members 26 and 29 are supported on the upper surfaces of the support square pipes 205 and 206 forming the support structure 200 with supporting members 26a and 29a such as rollers interposed therebetween, no distortion should not occur on the support surfaces of the support square pipes 206 and 207.

For this reason, any surface of square pipes having a bonded portion HP formed during the fabrication of the same is not used as the surface to support the first and second scanning members 26 and 29 as shown in FIG. 10B. In addition, in order to minimize the effect of distortion, the support structure 200 is fabricated such that any surface thereof having a bonded portion HP doesn't constitute a surface on which it is joined to the frames 201 and 202. This makes it possible to minimize the effect of any distortion on the support surfaces (e.g., upper surfaces) of the support square pipes 205 and 206 supporting the first and second scanning members 26 and 29 to provide preferable support surfaces.

As a result, vibration and the like of the first and second scanning members 26 and 29 during scanning are minimized to allow preferable scanning when they are directly supported by the support square pipes 205 and 206 in a manner in which they can travel. The first and second scanning members 26 and 29 have a configuration in which they are held and moved on one or two slide shafts (not shown) provided in parallel with the support square pipes 205 and 206 and in which a part of them is supported on the support square pipes 205 and 206 with rollers 26a and 29a or the like interposed.

Referring to the support square pipe 207 supporting the lens 20a and CCD 20 forming the reading unit 20U for receiving and reading an optical image scanned by the first and second scanning members 26 and 29, the support structure 200 is also configured such that its support surface is not constituted by a surface of a square pipe having a bonded portion HP thereon and supports and secures the CCD 20 and the like on a surface thereof different from the bonded portion HP. As shown in FIG. 10C which is a sectional view taken along the line C—C in FIG. 10A, the surface for supporting and securing the reading unit 20U comprising the CCD 20 and the like is constituted by a surface opposite to the bonded portion HP.

An example has been described wherein the reading unit 20U comprising the CCD 20 and lens 20a is directly secured to and supported by the support square pipe 207. However, the same effect can obviously be achieved by avoiding a bonded portion HP even when it is secured to and supported by the support square pipe 207 with a mounting and supporting member interposed.

The square pipes described above can be provided in the same manner as described in the first embodiment in which a flat sheet H is temporarily bent into a round pipe; both ends of the flat sheet H are welded to be bonded; and unnecessary parts are removed to form a bonded portion HP. Since it is molded into a square pipe thereafter, the bonded portion HP exists on one of the surfaces thereof. Therefore, the surface having the bonded portion HP is most significantly affected by distortion among the plurality of surfaces defining the square pipe. The configuration described in the above example is employed to prevent such a surface from being used as a surface to maintain positional relationship for positioning. This makes it possible to maintain a preferable positional relationship for improved positional accuracy free from the influence of distortion.

A description will now be made on a support structure for a copier comprising a scanner portion and an image forming portion.

Since the scanner portion 2 is provided separately from the image forming portion 3, no particular positional relationship is required between them. However, the positional relationship between them must be maintained in a configuration wherein an image of an original document is directly projected upon the photosensitive drum 31 unlike a case wherein the scanner portion 2 is constituted by the reading unit 20U comprising the CCD 20 and the like for optically reading an image. It is therefore necessary to eliminate distortion when the support structure 100 of the image forming portion 3 and the support structure 200 of the scanner portion 2 are assembled and combined.

This is the same as described with reference to the first embodiment of the present invention, and an attention must be paid to make the joining surface area between the square pipes forming the support structures 100 and 200 as small as possible.

Figure 14:
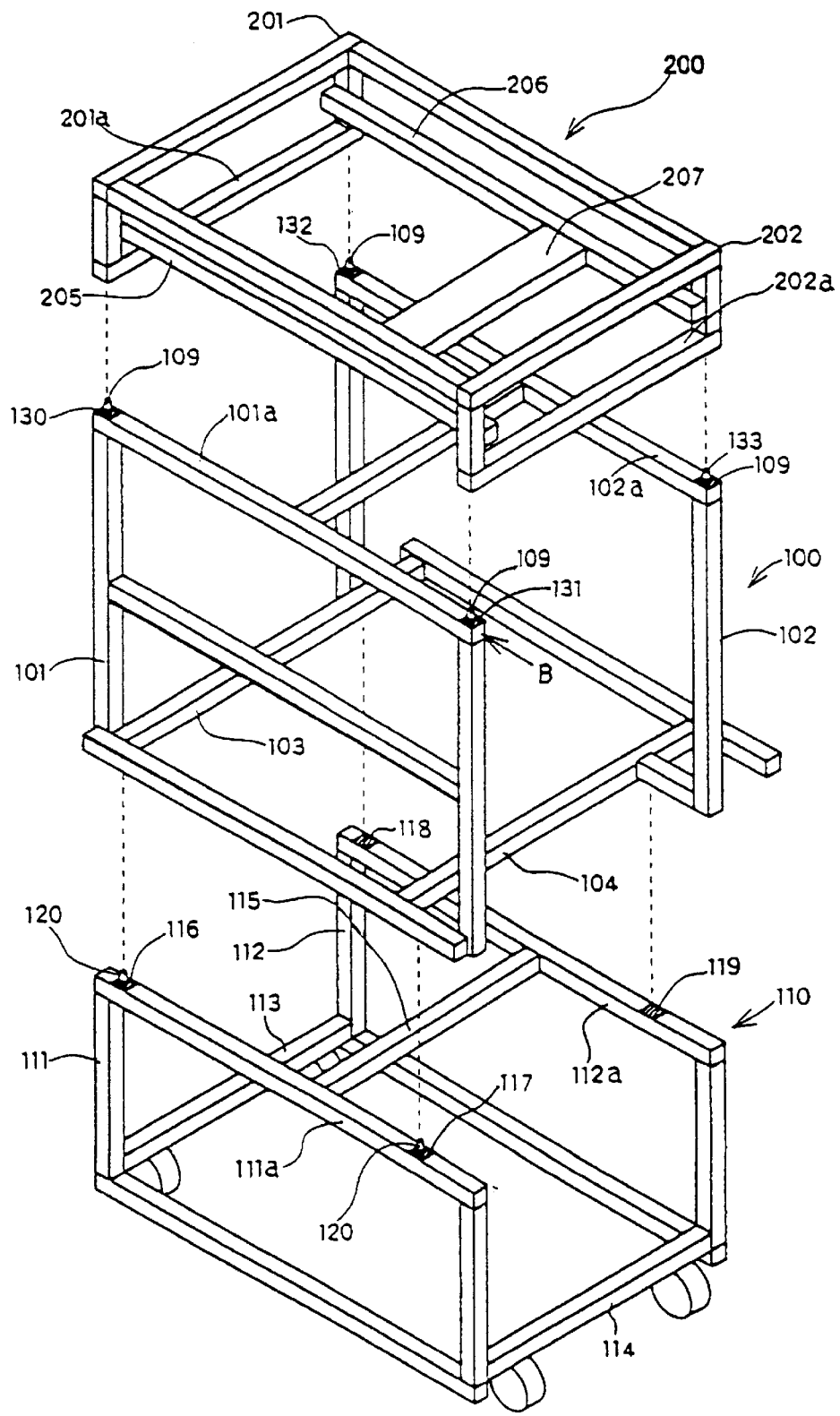
FIG. 14 is a perspective view showing the fabrication of an integrated support structure by combining support structures forming an image forming portion according to the second embodiment of the present invention.

For this purpose, as shown in FIG. 14, the support structure 100 that defines a space for containing and supporting components of the image forming portion 3 is provided with positioning pins 109 that constitute a positioning member for positioning the same relative to the support structure 200 for configuring the scanner portion 2. As illustrated, the positioning pins 109 are provided in association with corners (ends) of each of the upper square pipe 101a of the front-side frame 101 in a square configuration and the upper square pipe 102a of the rear-side frame 102.

The support structure 200 for the scanner portion 2 is formed with positioning holes into which the positioning pins 109 can be inserted in corners of the lower surface thereof corresponding to the corners of the upper surface of the support structure 100 where the positioning pins 109 are located. Therefore, the support structure 200 of the scanner portion 2 is joined to the support structure 100 of the image forming portion 3 under the same in contact therewith on joining surfaces 130 through 133 indicated by the shaded surfaces in the positioning regions.

They are connected and secured to each other after joining using a well-known connecting member or the like.

Figure 15:
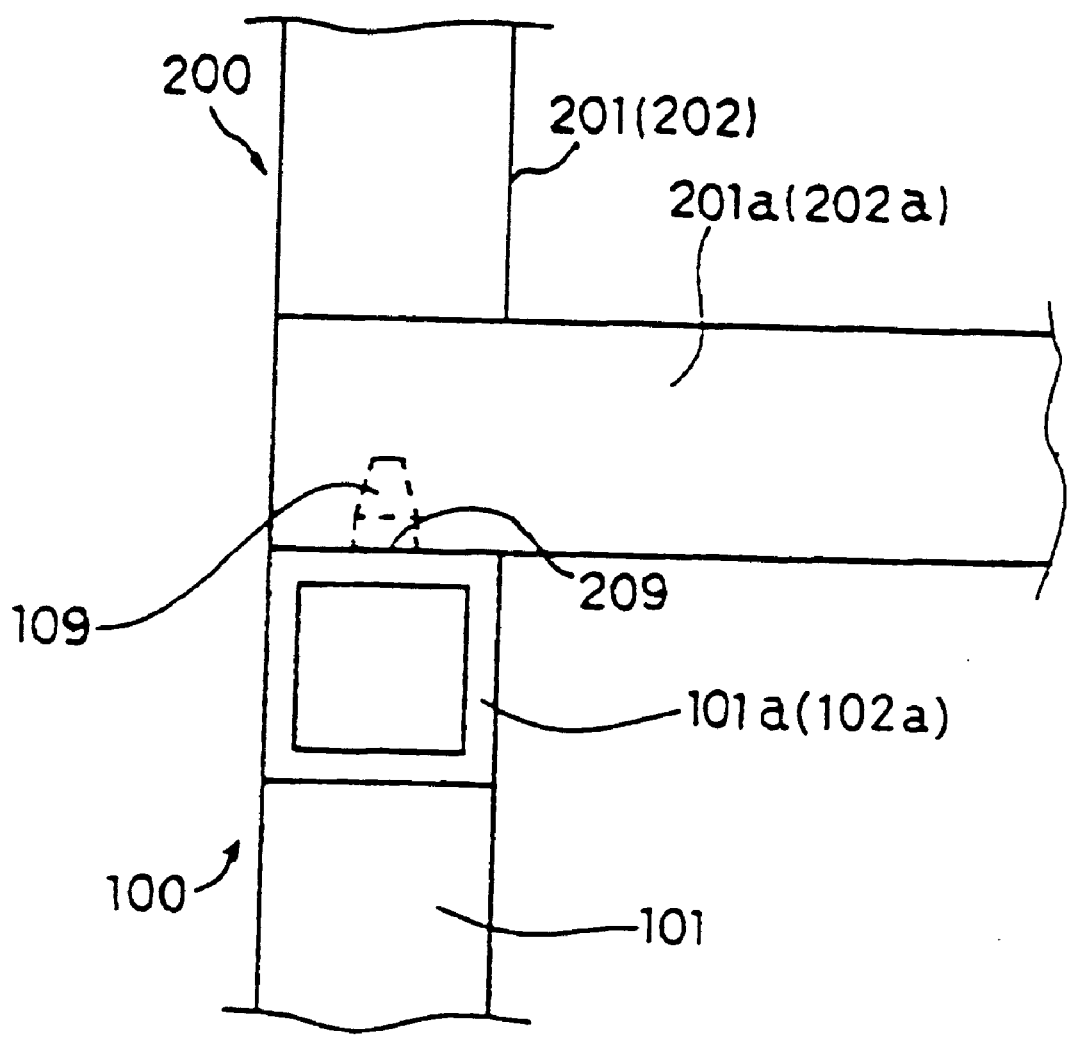
FIG. 15 is a plan view showing a state in which the support structures in FIG. 14 are positioned and combined with each other.

FIG. 15 shows a state in which the lower square pipe 201a (202a) forming a part of the support structure 200 for the scanner portion is joined to the upper square pipe 101a (102a) forming apart of the support structure 100 by inserting the positioning pins 109 of the lower support structure 100 into the positioning holes 209 formed on the lower square pipe 201a (202a). FIG. 15 shows a state of the first support structure 100 shown in FIG. 14 as viewed in the direction of the arrow B. Thus, the upper square pipe 101a (102a) and the lower square pipe 201a (202a) are joined in an orthogonal state.

When they are joined to each other in such a manner, it is possible to minimize the joining area, to minimize the effect exerted between them during assembly and to minimize distortion, twisting and the like that occur when joining. If the square pipes of the support structures 200 and the lower support structure 100 are joined to each other in parallel in the longitudinal direction (e.g., if the square pipes 101a and 201a are joined in parallel), they are joined in a large area. As a result, an excessive force acts when the support structures 200 and 100 are joined to produce mutual effects between them, thereby resulting in significant distortion, twisting and the like. As a result, distortion occurs at the support structure 200. This not only changes the positional relationship between the first and second scanning members 26 and 29, the CCD 20 of the reading unit 20U and the like which is otherwise maintained but also significantly changes the positional relationship thereof with the support structure 100.

As shown in FIG. 14, however, by connecting and securing them to each other after joining them such that their square pipes are orthogonal to each other, the above-described problem is solved and there will be no change in the positional relationship in the scanner portion 2 and no change in the positional relationship thereof with the support structure 200 of the image forming portion 3 assembled under the same.

A single integrated support structure can be fabricated by combining the support structure 100 supporting the components of the image forming portion 3 and the support structure 200 supporting the various components of the scanner portion 2 each other as described above. Since there is a small joining area when the scanner portion 2 and image forming portion 3 are integrated into the digital copier 1, distortion and the like of the support structures 100 and 200 can be minimized. It is therefore possible to fabricate an integrated support structure with a constant positional relationship maintained between them.

When the above-described scanner portion 2 is to be configured independently, the configuration can be provided by supporting components of the scanner portion 2 and, if it is to be used as a copier, such a configuration can be provided by combining the support structure 100 for supporting components of the image forming portion 3. Thus, those configurations can be provided by using the support structures 100 and 200 and the like having the same configurations as they are. Further, the positional relationship between the devices can be maintained by joining them in the manner as described with reference to FIG. 14.

Referring to FIG. 14, the lower support structure 110 and support structure 100 are joined in the same manner as in the first embodiment described with reference to FIG. 1, and the support structure 200 for the scanner portion 2 can be combined in addition to configure an integrated support structure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A support structure comprising:
   a first support structure for supporting respective components forming an electronic apparatus; and
   a second support structure provided separately from the first support structure, for supporting other components required for forming the electronic apparatus,
   the first and second support structures being combined to provide an integrated support structure for a single electronic apparatus,
   wherein each of the first and second support structures is formed by combining a plurality of square hollow members to provide spaces for containing and supporting the components and other components; and the square hollow members for the first support structure and the square hollow members for the second support structure are joined in a face-to-face relationship such that they are in contact with each other in a part of one face of each of them which are joined.

2. The support structure of claim 1, wherein the respective square hollow members forming the first and second support structures are joined to be in contact with each other in a part of one surface of each of them such that the square hollow members are orthogonal to each other.

3. The support structure of claim 1, wherein at least one of the square hollow members of the first and second support structures joined into contact is assembled to protrude from other square hollow members secured to the at least one square hollow member to form the support structure.

4. The support structure of claim 2, wherein the surfaces of the square hollow members forming the first support structure and the square hollow members forming the second support structure which are in contact with each other are not surfaces including bonded portions formed during the fabrication of the square hollow members.

5. The support structure of claim 1, wherein the surfaces of the square hollow members forming the first support structure and the square hollow members forming the second support structure which are in contact with each other are not surfaces including bonded portions formed during the fabrication of the square hollow members.

6. The support structure of claim 2, wherein the surfaces of the square hollow members forming the first support structure and the square hollow members forming the second support structure which are in contact with each other are not surfaces including bonded portions formed during the fabrication of the square hollow members.

7. The support structure of claim 1, wherein a positioning member is provided in a position where the first and second support structures are joined and in that the positioning member is provided in at least two points in the longitudinal direction thereof.

8. The support structure of claim 2, wherein a positioning member is provided in a position where the first and second support structures are joined and the positioning member is provided in at least two points in the longitudinal direction thereof.

9. The support structure of claim 7, wherein the electronic apparatus is an image forming apparatus for reproducing an image on a recording material;
   at least an image forming portion for reproducing an image on a recording material is supported by the first support structure; a supply portion for supplying a recording material to the image forming portion is supported by the second support structure; and positioning members are provided on each of the first and second support structures such that their longitudinal direction is the transport direction of the recording material.

10. The support structure of claim 8, wherein the electronic apparatus is an image forming apparatus for reproducing an image on a recording material; at least an image forming portion for reproducing an image on a recording material is supported by the first support structure; a supply portion for supplying a recording material to the image forming portion is supported by the second support structure; and the positioning members on each of the first and second support structures are provided such that their longitudinal direction is the transport direction of the recording material.

11. The support structure of claim 1, wherein at least either the first or second support structure includes retractable handles facing each other contained in a space between a pair of parallel square hollow members to allow the first or second support structure to be lifted in a stable state, thereby to be joined to a part of the other support structure while being lifted using the handles.

* * * * *